(12) United States Patent
Choi et al.

(10) Patent No.: US 11,096,112 B2
(45) Date of Patent: Aug. 17, 2021

(54) ELECTRONIC DEVICE FOR SETTING UP NETWORK OF EXTERNAL DEVICE AND METHOD FOR OPERATING SAME

(71) Applicant: Samsung Electronics Co., Ltd., Suwon-si (KR)

(72) Inventors: Bokun Choi, Suwon-si (KR); Doosuk Kang, Suwon-si (KR); Sunkey Lee, Suwon-si (KR); Junhak Lim, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/769,464

(22) PCT Filed: Dec. 4, 2018

(86) PCT No.: PCT/KR2018/015251
§ 371 (c)(1),
(2) Date: Jun. 3, 2020

(87) PCT Pub. No.: WO2019/112295
PCT Pub. Date: Jun. 13, 2019

(65) Prior Publication Data
US 2021/0195500 A1 Jun. 24, 2021

(30) Foreign Application Priority Data
Dec. 5, 2017 (KR) .......................... 10-2017-0166087

(51) Int. Cl.
*H04W 48/08* (2009.01)
*H04W 8/24* (2009.01)
(Continued)

(52) U.S. Cl.
CPC .............. *H04W 48/08* (2013.01); *H04W 4/50* (2018.02); *H04W 8/24* (2013.01); *H04W 12/06* (2013.01)

(58) Field of Classification Search
CPC ....... H04W 48/08; H04W 4/50; H04W 12/06; H04W 8/24
See application file for complete search history.

(56) References Cited

U.S. PATENT DOCUMENTS 9,418,658 B1 8/2016 David et al.
2006/0282649 A1 12/2006 Malamud et al.
(Continued)

FOREIGN PATENT DOCUMENTS

KR 10-2013-0043336 A 4/2013
KR 10-2015-0044665 A 4/2015
(Continued)

*Primary Examiner* — Joseph E Dean, Jr.
(74) *Attorney, Agent, or Firm* — Jefferson IP Law, LLP

(57) ABSTRACT

Various embodiments of the present invention relate to an electronic device for setting up a network of an external device by using a voice input and a method for operating the same. An electronic device according to various embodiments of the present invention comprises: a network interface; a wireless communication circuit configured to provide at least one wireless network; a processor operatively connected to the network interface and to the wireless communication circuit; and a memory operatively connected to the processor. The memory is configured to store a selected SSID and at least one piece of user account information. The memory may store instructions that, when executed, cause the processor to receive the selected SSID from a first external device comprising a speaker and a microphone through the wireless communication circuit; to receive first device information of the first external device from the first external device through the wireless communication circuit; to connect the first external device to the wireless network (Continued)

at least temporarily; to transmit the first device information and the user account information to an external server through the network interface; to receive first data including information regarding a setup utterance related to the user account information from the external server through the network interface; and to transmit at least a part of the first data to the first external device through the wireless communication circuit. Various other embodiments are also possible.

15 Claims, 24 Drawing Sheets

(51) Int. Cl.
*H04W 12/06* (2021.01)
*H04W 4/50* (2018.01)

(56) References Cited

U.S. PATENT DOCUMENTS

| | | | |
|---|---|---|---|
| 2015/0109897 A1 | 4/2015 | Lee et al. | |
| 2016/0366708 A1 | 12/2016 | Yeom et al. | |
| 2016/0373270 A1 | 12/2016 | Yang et al. | |
| 2017/0061964 A1* | 3/2017 | Xiong | H04N 21/25816 |
| 2017/0094511 A1 | 3/2017 | Na et al. | |
| 2018/0357403 A1* | 12/2018 | Shnurenko | H04L 9/3228 |

FOREIGN PATENT DOCUMENTS

| | | |
|---|---|---|
| KR | 10-2015-0092873 A | 8/2015 |
| KR | 10-2016-0146346 A | 12/2016 |
| KR | 10-2017-0036198 A | 4/2017 |
| WO | 2017/099342 A1 | 6/2017 |

* cited by examiner

ELECTRONIC DEVICE FOR SETTING UP NETWORK OF EXTERNAL DEVICE AND METHOD FOR OPERATING SAME

TECHNICAL FIELD

Various embodiments of the disclosure relate to an electronic device for setting up a network of an external device by using a speech input and a method for operating the same

BACKGROUND ART

With the development of Internet of things (IoT) technology which enables connection to the Internet by embedding sensor functions and communication functions in various objects, various types of IoT devices providing various services are rapidly spreading.

An IoT device may generally communicate with an external network via a wireless LAN, such as Wi-Fi. In order for an IoT device to communicate with an external network via a wireless LAN, the IoT device is first required to be connected to a device (e.g., a router) that provides a wireless access service. A user connects an IoT device to a device (e.g., a router) that provides a wireless access service, by using an input/output module provided in the IoT device.

DISCLOSURE OF INVENTION

Technical Problem

It may not be easy to connect, to a router, a dedicated input device (e.g., a remote controller), which is capable of directly processing a user input, or an IoT device that does not have a display. For example, the user may experience inconvenience when selecting one of a plurality of routers or when performing authentication (e.g., when inputting account information).

Solution to Problem

An electronic device according to various embodiments of the disclosure may include: a network interface; a wireless communication circuit configured to provide at least one wireless network; a processor operatively connected to the network interface and the wireless communication circuit; and a memory operatively connected to the processor, wherein the memory is configured to store a selected SSID and at least one piece of user account information, and the memory stores instructions causing, when executed, the processor to: receive the selected SSID from a first external device including a speaker and a microphone via the wireless communication circuit; receive first device information of the first external device from the first external device via the wireless communication circuit; at least temporarily connect the first external device to the wireless network; transmit the first device information and the user account information to an external server via the network interface; receive first data from the external server via the network interface, wherein the first data includes information on a setup utterance associated with the user account information; and transmit at least a part of the first data to the first external device via the wireless communication circuit.

An electronic device according to various embodiments of the disclosure may include: a speaker; a microphone; a wireless communication circuit configured to provide wireless communication; a processor operatively connected to the speaker, the microphone, and the wireless communication circuit; and a memory operatively connected to the processor, wherein the memory is configured to store a selected SSID, and the memory stores instructions causing, when executed, the processor to: transmit the selected SSID to an AP device via the wireless communication circuit; transmit first device information of the electronic device to the AP device via the wireless communication circuit; receive first data including information on setup utterance related to user account information from the AP device via the wireless communication circuit; on the basis of the first data, generate an utterance by means of the speaker, and receive a user utterance by means of the microphone; and transmit second data associated with the user utterance to the AP device via the wireless communication circuit.

Advantageous Effects of Invention

An electronic device and an operation method thereof according to various embodiments are for performing network setup using a speech input, and may enable easy connection of an IoT device, which does not have a dedicated input device or a display, to a router, thereby improving user convenience.

BEST MODE FOR CARRYING OUT THE INVENTION

Before describing an embodiment of the disclosure, an integrated intelligence system, to which an embodiment of the disclosure may be applied, will be described.

Figure 1:
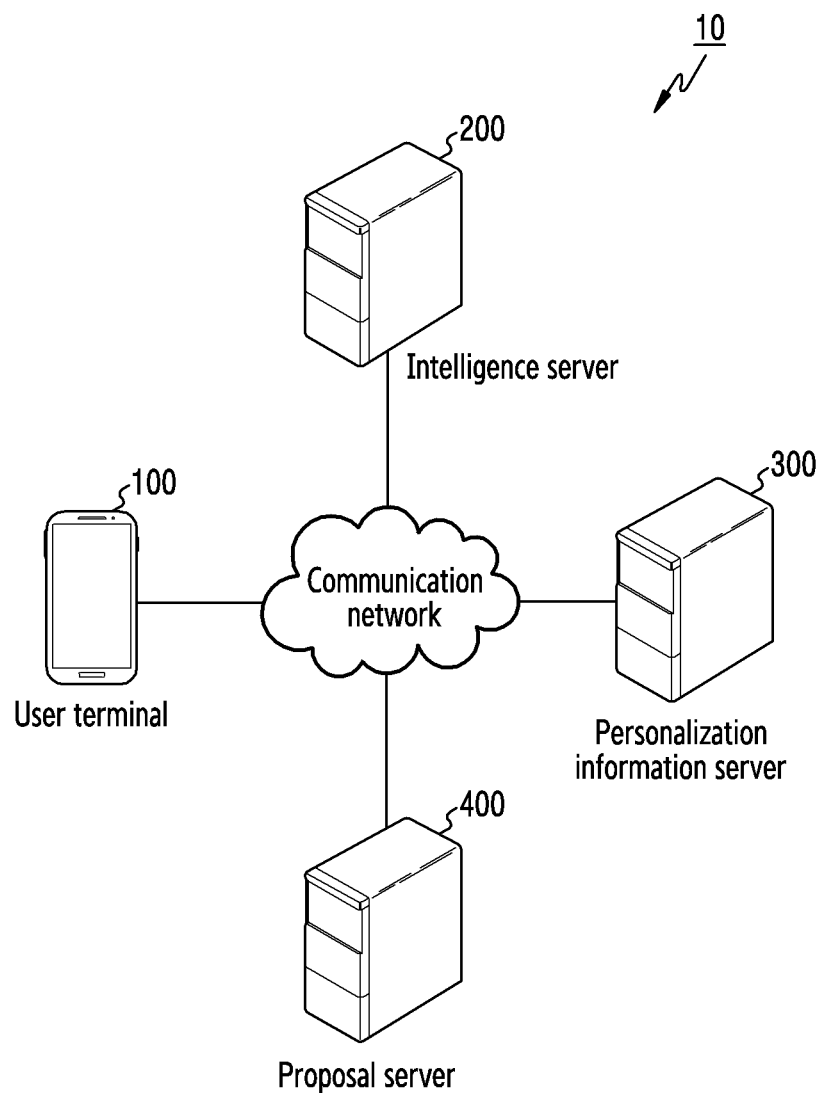
FIG. 1 is a diagram illustrating an integrated intelligence system according to various embodiments of the disclosure.

FIG. 1 is a diagram illustrating an integrated intelligence system according to various embodiments of the disclosure.

Referring to FIG. 1, an integrated intelligence system 10 may include a user terminal 100, an intelligence server 200, a personalization information server 300, or a proposal server 400.

The user terminal 100 may provide a service necessary for a user via an app (or an application program) (e.g., an alarm app, a message app, a picture (gallery) app, etc.) stored within the user terminal 100. For example, the user terminal 100 may execute and operate another app via an intelligence app (or a speech recognition app) stored within the user terminal 100. A user input for executing and operating the another app via the intelligence app of the user terminal 100 may be received. The user input may be received via, for example, a physical button, a touch pad, a speech input, a remote input, and the like. According to an embodiment, the user terminal 100 may be various terminal devices (or electronic devices) connectible to the Internet, such as a mobile phone, a smartphone, a personal digital assistant (PDA), or a notebook computer.

According to an embodiment, the user terminal 100 may receive a user utterance as a user input. The user terminal 100 may receive a user utterance, and may generate a command that operates an app, on the basis of the user utterance. Accordingly, the user terminal 100 may operate the app by using the command.

The intelligence server 200 may receive a user speech input from the user terminal 100 via a communication network, and may change the received user speech input to text data. In another embodiment, the intelligence server 200 may generate (or select) a path rule on the basis of the text data. The path rule may include information on an action (or operation) for performing a function of an app or information on a parameter necessary to execute the operations. The path rule may include a sequence of the operations of the app. The user terminal 100 may receive the path rule, may select an app according to the path rule, and may execute operations included in the path rule by the selected app.

The term "path rule" in the document may generally mean a sequence of states for an electronic device to perform a task requested by a user, but is not limited thereto. In other words, the path rule may include information on a sequence of states. The task may be, for example, any action that may be provided by the intelligence app. The task may include generating a schedule, transmitting a photo to a desired counterpart, or providing weather information. The user terminal 100 may perform the task by sequentially having at least one state (e.g., operation states of the user terminal 100).

According to an embodiment, the path rule may be provided or generated by an artificial intelligent (AI) system. The artificial intelligent system may be a rule-based system, and may be a neural network-based system (e.g., a feedforward neural network (FNN)) or a recurrent neural network (RNN). Alternatively, the artificial intelligent system may be a combination of the above or other artificial intelligent systems. According to an embodiment, the path rule may be selected from a predefined set of pass rules, or may be generated in real time in response to a user request. For example, the artificial intelligence system may at least select a pass rule from among a plurality of predefined pass rules or generate a pass rule dynamically (or in real time). In addition, the user terminal 100 may use a hybrid system to provide the pass rule.

According to an embodiment, the user terminal 100 may execute the operations and may display, on a display, a screen corresponding to a state of the user terminal 100 having executed the operations. For another example, the user terminal 100 may execute the operations and may not display results of performing the operations on the display. The user terminal 100 may, for example, execute multiple operations, and may display only some results of the multiple operations on the display. The user terminal 100 may display, on the display, only a result obtained by executing a last operation in the sequence. As still another example, the user terminal 100 may receive a user input and may display, on the display, a result obtained by executing the operations.

The personalization information server 300 may include a database storing user information. For example, the personalization information server 300 may receive user information (e.g., context information, app execution, etc.) from the user terminal 100, and may store the received user information in the database. The intelligence server 200 may receive the user information from the personalization information server 300 via the communication network, and may use the received user information in a case of generating a path rule for the user input. According to an embodiment, the user terminal 100 may receive user information from the personalization information server 300 via the communication network, and may use the received user information as information for managing the database.

The proposal server 400 may include a database storing information on a function to be provided or an introduction of an application or a function in the terminal. For example, the proposal server 400 may receive user information of the user terminal 100 from the personalization information server 300, and may include a database for a function available to a user. The user terminal 100 may receive information on a function to be provided, from the proposal server 400 via a communication network, and may provide the information to the user.

Figure 2:
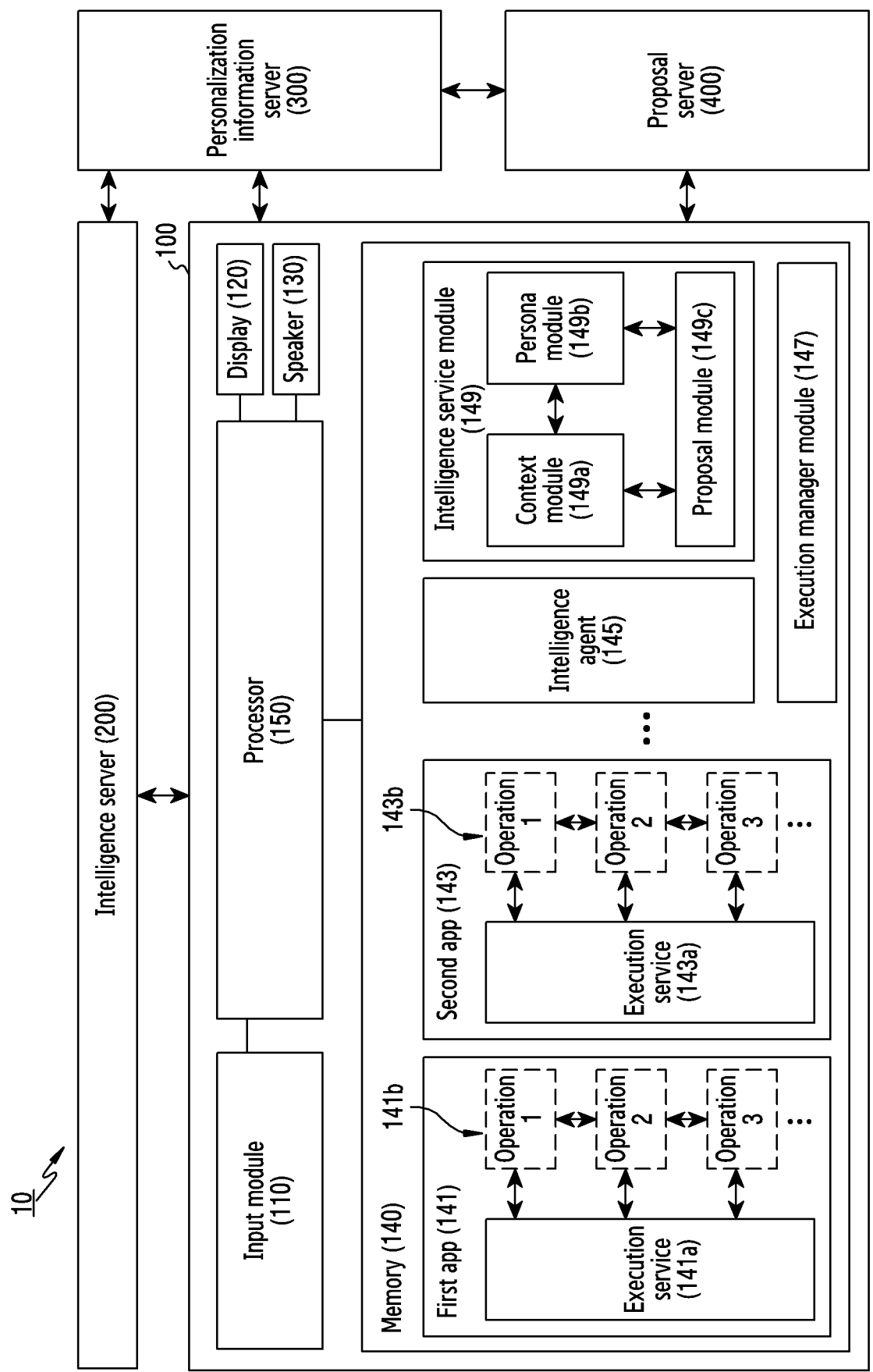
FIG. 2 is a block diagram illustrating a user terminal of the integrated intelligence system according to an embodiment of the disclosure.

FIG. 2 is a block diagram illustrating a user terminal of the integrated intelligence system according to an embodiment of the disclosure.

Referring to FIG. 2, the user terminal 100 may include an input module 110, a display 120, a speaker 130, a memory 140, or a processor 150. The user terminal 100 may further include a housing, and elements of the user terminal 100 may be seated inside the housing or may be located on the housing. The user terminal 100 may further include a communication circuit located inside the housing. The user terminal 100 may transmit data (or information) to or receive data (or information) from an external server (e.g., the intelligence server 200) via the communication circuit.

According to an embodiment, the input module 110 may receive a user input from a user. For example, the input module 110 may receive a user input from a connected external device (e.g., a keyboard and a headset). For another example, the input module 110 may include a touch screen (e.g., a touchscreen display) coupled with the display 120. As still another example, the input module 110 may include a hardware key (or a physical key) located in the user terminal 100 (or the housing of the user terminal 100).

According to an embodiment, the input module 110 may include a microphone capable of receiving a user utterance as a voice signal. For example, the input module 110 may include an utterance input system (speech input system), and may receive a user utterance as a voice signal via the speech input system. The microphone may be exposed, for example, through a part (e.g., a first part) of the housing.

According to an embodiment, the display 120 may display an image or a video, and/or an execution screen of an application. For example, the display 120 may display a graphic user interface (GUI) of an app. According to an embodiment, the display 120 may be exposed through a part (e.g., a second part) of the housing.

According to an embodiment, the speaker 130 may output a voice signal. For example, the speaker 130 may output a voice signal generated inside the user terminal 100 to the outside. According to an embodiment, the display 130 may be exposed through a part (e.g., a third part) of the housing.

According to an embodiment, the memory 140 may store a plurality of apps (or application programs) 141 and 143. The plurality of apps 141 and 143 may be, for example, programs for performing a function corresponding to a user input. According to an embodiment, the memory 140 may store an intelligence agent 145, an execution manager module 147, or an intelligence service module 149. The intelligence agent 145, the execution manager module 147, and the intelligence service module 149 may be, for example, a framework (or an application framework) for processing a received user input (e.g., a user utterance).

According to an embodiment, the memory 140 may include a database capable of storing information necessary to recognize a user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded and operated. For example, the plurality of apps 141 and 143 stored in the memory 140 may be loaded and operated by the execution manager module 147. The plurality of apps 141 and 143 may include execution service modules 141a and 143a that perform functions. In an embodiment, the plurality of apps 141 and 143 may execute a plurality of operations (e.g., a sequence of states) 141b and 143b via the execution service modules 141a and 143a in order to perform functions. In other words, the execution service modules 141a and 143a may be activated by the execution manager module 147, and may perform the plurality of operations 141b and 143b.

According to an embodiment, when the operations 141b and 143b of the apps 141 and 143 are executed, an execution state screen according to execution of the operations 141b and 143b may be displayed on the display 120. For example, the execution state screen may be a screen of a state in which the operations 141b and 143b have been completed. For another example, the execution state screen may be a screen of a partial landing state (e.g., in a case where a parameter necessary for the operations 141b and 143b is not input) in which execution of the operations 141b and 143b has stopped.

According to an embodiment, the execution service modules 141a and 143a may execute the operations 141b and 143b according to the path rule. For example, the execution service modules 141a and 143a may be activated by the execution manager module 147, may receive an execution request according to the path rule from the execution manager module 147, and may perform the operations 141b and 143b in response to the execution request, thereby executing a function of the apps 141 and 143. When execution of the operations 141b and 143b is completed, the execution service modules 141a and 143a may transfer completion information to the execution manager module 147.

According to an embodiment, if the plurality of operations 141b and 143b are executed in the apps 141 and 143, the plurality of operations 141b and 143b may be sequentially executed. When execution of one operation (e.g., operation 1 of the first app 141 or operation 1 of the second app 143) is completed, the execution service modules 141a and 143a may open a next operation (e.g., operation 2 of the first app 141 or operation 2 of the second app 143), and may transmit completion information to the execution manager module 147. Here, opening of an operation may be understood as shifting the operation to an executable state or preparing for execution of the operation. In other words, if an operation is not opened, the operation may not be executed. When the completion information is received, the execution manager module 147 may transfer an execution request for the next operation (e.g., operation 2 of the first app 141 or operation 2 of the second app 143) to the execution service module. According to an embodiment, if the plurality of apps 141 and 143 are executed, the plurality of apps 141 and 143 may be sequentially executed. For example, if execution of a last operation of the first app 141 (e.g., operation 3 of the first app 141) is completed and completion information is received, the execution manager module 147 may transmit an execution request of a first operation (e.g., operation 1 of the second app 143) of the second app 143 to the execution service module 143a.

According to an embodiment, when the plurality of operations 141b and 143b are executed in the apps 141 and 143, result screens according to execution of the respective executed operations 141b and 143b may be displayed on the display 120. According to an embodiment, only a part of the multiple result screens according to execution of the plurality of executed operations 141b and 143b may be displayed on the display 120.

According to an embodiment, the memory 140 may store an intelligence app (e.g., a speech recognition application) linked to an intelligence agent 145. The app linked to the intelligence agent 145 may receive and process a user utterance as a voice signal. According to an embodiment, the app linked to the intelligence agent 145 may be operated by a specific input (e.g., an input via a hardware key, an input via a touchscreen, and a specific speech input) that is input via an input module 110.

According to an embodiment, the processor 140 may execute the intelligence agent 145, the execution manager module 147, or an intelligence service module 150, which are included in the memory 140. Functions of the intelligence agent 145, the execution manager module 147, or the intelligence service module 149 may be implemented by the processor 150. The functions of the intelligence agent 145, the execution manager module 147, and the intelligence service module 149 will be described with operations of the processor 150. According to an embodiment, the intelligence agent 145, the execution manager module 147, or the intelligence service module 149, which are stored in the memory 140 may be implemented in hardware as well as software.

According to an embodiment, the processor 150 may control overall operations of the user terminal 100. For example, the processor 150 may control the input module 110 to receive a user input. The processor 150 may control the display 120 to display an image. The processor 150 may control the speaker 130 to output a voice signal. The processor 150 may control the memory 140 to execute a program and may load or store necessary information.

According to an embodiment, the processor 140 may execute the intelligence agent 145, the execution manager module 147, or the intelligence service module 149, which are stored in the memory 140. According to an embodiment, the processor 150 may implement the functions of the intelligence agent 145, the execution manager module 147, or the intelligence service module 149.

According to an embodiment, the processor 150 may execute the intelligence agent 145 to generate a command to operate the app on the basis of a voice signal received as a user input. According to an embodiment, the processor 150 may execute the execution manager module 147 to execute the apps 141 and 143 stored in the memory 140 according to the generated command According to an embodiment, the processor 150 may execute the intelligence service module 149 to manage user information, and may process the user input by using the user information.

The processor 150 may execute the intelligence agent 145 to transmit the user input received via the input module 110 to the intelligence server 200 and may process the user input via the intelligence server 200.

According to an embodiment, the processor 150 may execute the intelligence agent 145 to pre-process the user input before transmitting the user input to the intelligence server 200. According to an embodiment, in order to pre-process the user input, the intelligence agent 145 may include an adaptive echo canceller (AEC) module, a noise suppression (NS) module, and an end-point detection (EPD) module, or an automatic gain control (AGC) module. The adaptive echo cancellation unit may remove an echo included in the user input. The noise suppression module may suppress background noise included in the user input. The end-point detection module may detect an end point of a user speech included in the user input, and may find a part, in which the user speech exists, using the detected end point. The automatic gain control module may recognize the user input, and may adjust a volume of the user input to be suitable for processing the recognized user input. According to an embodiment, the processor 150 may execute all the pre-processing elements for performance, but in another embodiment, the processor 150 may execute a part of the pre-processing elements to operate at low power.

According to an embodiment, the intelligence agent 145 may execute a wake-up recognition module that is stored in the memory 140 so as to recognize a user's call. Accordingly, the processor 150 may recognize a wake-up command of the user via the wake-up recognition module, and may execute the intelligence agent 145 for receiving the user input if the wake-up command is received. The wake-up recognition module may be implemented as a low power processor (e.g., a processor included in an audio codec). According to an embodiment, the processor 150 may execute the intelligence agent 145 when a user input via a hardware key is received. When the intelligence agent 145 is executed, an intelligence app (e.g., a speech recognition app) linked to the intelligence agent 145 may be executed.

According to an embodiment, the intelligence agent 145 may include a speech recognition module that performs a user input. The processor 150 may recognize a user input for execution of an operation in the app via the speech recognition module. For example, the processor 150 may recognize a limited user (speech) input (e.g., a sound, such as "click" that causes a photographing operation while a camera app is running) which executes an operation, such as the wake-up command, in the apps 141 and 143 via the speech recognition module. The processor 150 may assist the intelligence server 200 to recognize and quickly process a user command executable in the user terminal 100 via the speech recognition module. According to an embodiment, the speech recognition module of the intelligence agent 145 for executing a user input may be implemented in an app processor.

According to an embodiment, the speech recognition module (including the speech recognition module of a wake-up module) of the intelligence agent 145 may recognize a user input by using an algorithm for speech recognition. The algorithm used to recognize speech may be, for example, at least one of a hidden Markov model (HMM) algorithm, an artificial neural network (ANN) algorithm, or a dynamic time warping (DTW) algorithm.

According to an embodiment, the processor 150 may execute the intelligence agent 145 to convert a speech input of the user into text data. For example, the processor 150 may transmit the user's speech to the intelligence server 200 via the intelligence agent 145 and may receive text data corresponding to the user's speech from the intelligence server 200. Accordingly, the processor 150 may display the converted text data on the display 120.

According to an embodiment, the processor 150 may execute the intelligence agent 145 to receive a pass rule from the intelligence server 200. According to an embodiment, the processor 150 may transfer the pass rule to the execution manager module 147 via the intelligence agent 145.

According to an embodiment, the processor 150 may execute the intelligence agent 145 to transfer, to the intelligence service module 149, an execution result log according to the pass rule received from the intelligence server 200, and the transferred execution result log may be accumulated in user preference information of a persona module 149*b* and managed.

According to an embodiment, the processor 150 may execute the execution manager module 147 to receive the pass rules from the intelligence agent 145 and execute the apps 141 and 143, and may enable the apps 141 and 143 to execute operations 141*b* and 143*b* included in the pass rules. For example, the processor 150 may transmit, to the apps 141 and 143, command information (e.g., pass rule information) for execution of operations 141*b* and 143*b* via the execution manager module 147, and may receive completion information of operations 141*b* and 143*b* from the apps 141 and 143.

According to an embodiment, the processor 150 may execute the execution manager module 147 to transfer command information (e.g., path rule information) for execution of operations 141*b* and 143*b* of the apps 141 and 143 between the intelligence agent 145 and the apps 141 and 143. The processor 150 may bind the apps 141 and 143 to be executed according to the pass rule via the execution manager module 147, and may transfer command information (e.g., path rule information) of operations 141*b* and 143*b* included in the pass rule to the apps 141 and 143. For example, the processor 150 may sequentially transfer operations 141*b* and 143*b* included in the path rule to the apps 141 and 143 via the execution manager module 147, so as to sequentially execute operations 141*b* and 143*b* of the apps 141 and 143 according to the path rule.

According to an embodiment, the processor 150 may execute the execution manager module 147 to manage execution states of operations 141*b* and 143*b* of the apps 141 and 143. For example, the processor 150 may receive information on the execution states of operations 141*b* and 143*b* from the apps 141 and 143 via the execution manager module 147. If the execution states of operations 141*b* and 143*b* are, for example, a stopped state (partial landing) (e.g., a case where parameters necessary for operations 141*b* and 143*b* have not been input), the processor 150 may transfer information on partial landing to the intelligence agent 145 via the execution manager module 147. The processor 150 may request the user to input necessary information (e.g., parameter information), using the received information via the intelligence agent 145. If the execution states of operations 141*b* and 143*b* are, for example, an operation state, the processor 150 may receive an utterance from the user via the intelligence agent 145. The processor 150 may transfer information on the apps 141 and 143 which are being executed and information on the execution states of the apps 141 and 143 to the intelligence agent 145 via the execution manager module 147. The processor 150 may transmit the user utterance to the intelligence server 200 via the intelligence agent 145. The processor 150 may receive parameter information of the user utterance from the intelligence server 200 via the intelligence agent 145. The processor 150 may transfer the received parameter information to the execution manager module 147 via the intelligence agent 145. The execution manager module 147 may change the parameters of the operations 141*b* and 143*b* to new parameters by using the received parameter information.

According to an embodiment, the processor 150 may execute the execution manager module 147 to transfer parameter information included in the pass rule to the apps 141 and 143. If the multiple apps 141 and 143 are sequentially executed according to the path rule, the execution manager module 147 may transfer the parameter information included in the path rule from one app to the other.

According to an embodiment, the processor 150 may execute the execution manager module 147 to receive a plurality of pass rules. The processor 150 may select the plurality of pass rules on the basis of the user utterance via the execution manager module 147. For example, if the user utterance specifies one app 141 to execute a partial operation 141*a* but does not specify another app 143 to execute the remaining operation 143*b*, via the execution manager module 147, the processor 150 may receive multiple different path rules in which an identical app 141 (e.g., a gallery app) to execute the partial operation 141*a* is executed, and different apps 143 (e.g., a message app and a Telegram app) capable of executing the remaining operation 143*b* are separately executed. The processor 150 may execute, for example, the same operations 141*b* and 143*b* of the plurality of pass rules (e.g., the same continuous operations 141*b* and 143*b*) via the execution manager module 147. If up to the same operation is executed, the processor 150 may display, on the display 120, a state screen enabling selection of different apps 141 and 143 included in the plurality of respective pass rules via the execution manager module 147.

According to an embodiment, the intelligence service module 149 may include a context module 149*a*, a persona module 149*b*, or a proposal module 149*c*.

The processor 150 may execute the context module 149*a* to collect current states of the apps 141 and 143 from the apps 141 and 143. For example, the processor 150 may execute the context module 149*a* to receive context information indicating the current states of the apps 141 and 143, and may collect the current states of the apps 141 and 143 on the basis of the received context information.

The processor 150 may execute the persona module 149*b* to manage personal information of a user using the user terminal 100. For example, the processor 150 may execute the persona module 149*b* to collect an execution result and use information of the user terminal 100, and may manage personal information of the user by using the collected execution result and use information of the user terminal 100.

The processor 150 may execute the proposal module 149*c* to predict an intention of the user, and may recommend a command to the user on the basis of the intention of the user. For example, the processor 150 may execute the proposal module 149*c* to recommend a command to the user according to a current state of the user (e.g., time, place, situation, and app).

Figure 3:
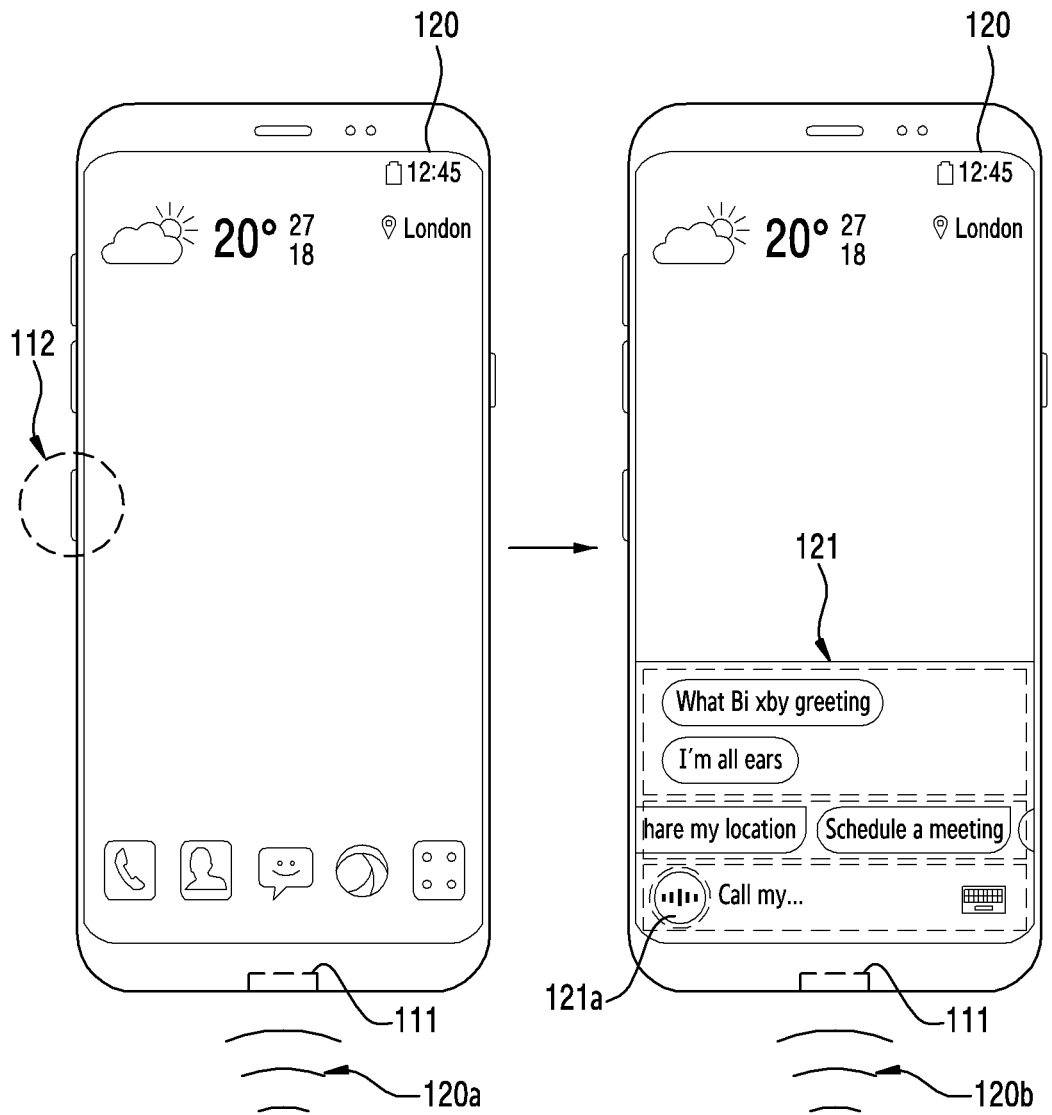
FIG. 3 is a diagram illustrating execution of an intelligence app by the user terminal according to an embodiment of the disclosure.

FIG. 3 is a diagram illustrating execution of an intelligence app by the user terminal according to an embodiment of the disclosure.

Referring to FIG. 3, the user terminal 100 receives a user input and executes an intelligence app (e.g., a speech recognition app) linked to the intelligence agent 145.

According to an embodiment, the user terminal 100 may execute the intelligence app for speech recognition via a hardware key 112. For example, the user terminal 100 may display, on the display 120, a user interface (UI) 121 of the intelligence app, if the user input is received via the hardware key 112. A user may, for example, touch a speech recognition button 121*a* in the UI 121 of the intelligence app so as to input 111*b* a speech, in a state where the UI 121 of the intelligence app is displayed on the display 120. The user may, for another example, continuously press the hardware key 112 to input 120*b* a speech.

According to an embodiment, the user terminal 100 may execute the intelligence app for speech recognition via a microphone 111. For example, the user terminal 100 may display the UI 121 of the intelligence app on the display 120 if a designated speech (e.g., Wake up!) is input 111*a* via the microphone 111.

Figure 4:
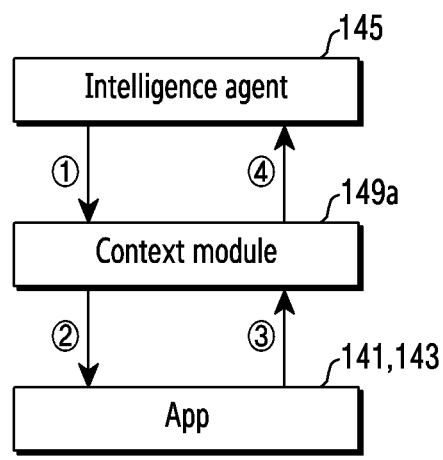
FIG. 4 is a diagram illustrating collection of a current state by a context module of an intelligence service module according to an embodiment of the disclosure.

FIG. 4 is a diagram illustrating collection of a current state by a context module of an intelligence service module according to an embodiment of the disclosure.

Referring to FIG. 4, when a context request is received (①) from the intelligence agent 145, the processor 150 may request (②) context information indicating current states of the apps 141 and 143 via the context module 149*a*. According to an embodiment, the processor 150 may receive (③) the context information from the apps 141 and 143 via the context module 149*a* and may transmit (④) the received context information to the intelligence agent 145.

According to an embodiment, the processor 150 may receive multiple pieces of context information from the apps 141 and 143 via the context module 149*a*. The context information may be, for example, information on the most recently executed apps 141 and 143. The context information may be, for example, information on the current states in the apps 141 and 143 (e.g., information on a photo when viewing the photo in a gallery).

According to an embodiment, the context module 149*a* may receive context information indicating a current state of the user terminal 100 from a device platform as well as the apps 141 and 143 via the context module 149*a*. The context information may include general context information, user context information, or device context information.

The general context information may include general information of the user terminal 100. The general context information may be determined via an internal algorithm by receiving data via a sensor hub, etc. of the device platform. For example, the general context information may include information of a current time/space. The information of the current time/space may include, for example, information on a current time or a current location of the user terminal 100. The current time may be determined via time on the user terminal 100, and the information on the current location may be determined via a global positioning system (GPS). For example, the general context information may include information on physical movement. The information of physical movement may include, for example, information on walking, running, driving, and the like. The information of physical movement may be determined via a motion sensor. In relation to the information on driving, driving may be determined via the motion sensor, and boarding and parking may be determined by sensing a Bluetooth connection in a vehicle. For another example, the general context information may include user activity information. The user activity information may include, for example, information on commuting, shopping, travelling, and the like. The user activity information may be determined using information of a place registered in a database by a user or an app.

The user context information may include information of a user. For example, the user context information may include information on an emotional state of the user. The information on the emotional state of the user may include, for example, information on the user's happiness, sadness, anger, and the like. For another example, the user context information may include information on a current state of the user. The information on the current state of the user may include, for example, information on interest, intention, and the like (e.g., shopping).

The device context information may include information on a state of the user terminal 100. For example, the device context information may include information on a path rule executed by the execution manager module 147. For another example, the device information may include battery information. The battery information may be determined, for example, via a charging or discharging state of the battery. For another example, the device information may include information on a connected device and information on a network. Information on the connected device may be determined, for example, via a communication interface connected to the device.

Figure 5:
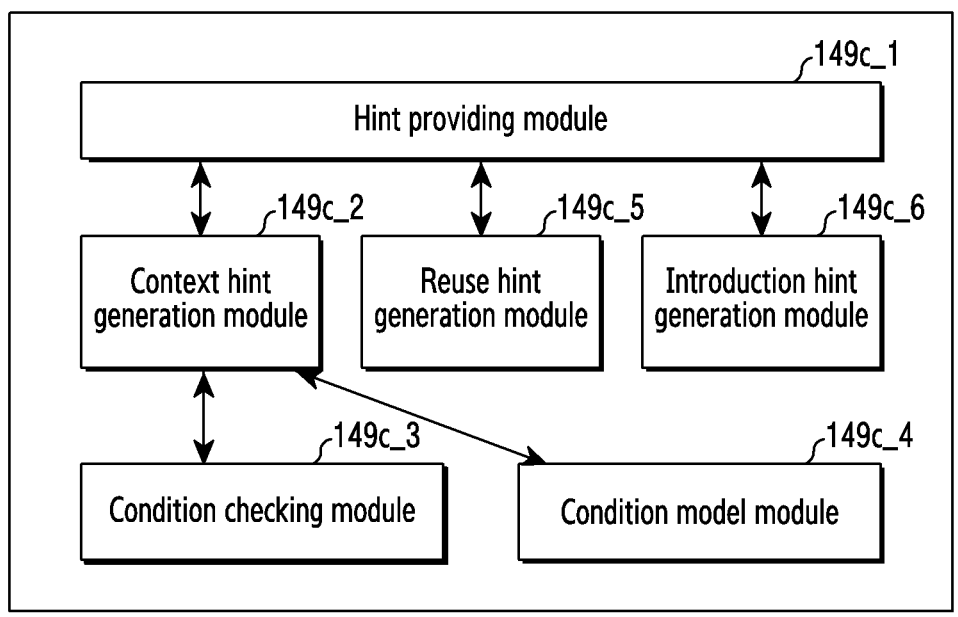
FIG. 5 is a block diagram illustrating a proposal module of the intelligence service module according to an embodiment of the disclosure.

FIG. 5 is a block diagram illustrating a proposal module of the intelligence service module according to an embodiment of the disclosure.

Referring to FIG. 5, the proposal module 149*c* may include a hint providing module 149*c*_1, a context hint generation module 149*c*_2, a condition checking module 149*c*_3, a condition model module 149*c*_4, a reuse hint generation module 149*c*_5, or an introduction hint generation module 149*c*_6.

According to an embodiment, the processor 150 may execute the hint providing module 149*c*_1 to provide a hint to a user. For example, the processor 150 may receive a hint generated from the context hint generation module 149*c*_2, the reuse hint generation module 149*c*_5, or the introduction hint generation module 149*c*_6 via the hint providing module 149*c*_1, and may provide the hint to the user.

According to an embodiment, the processor 150 may generate a hint that may be recommended according to a current state by executing the condition checking module 149*c*_3 or the condition model module 149*c*_4. The processor 150 may execute the condition checking module 149*c*_3 to receive information corresponding to the current state, and may execute the condition model module 149*c*_4 to configure the condition model by using the received information. For example, the processor 150 may execute the condition model module 149*c*_4 to determine a time, a location, a situation, and an app in use at a point in time when the hint is provided to the user, and may provide the user with the hint that is likely to be used under a corresponding condition in a descending order of priority.

According to an embodiment, the processor 150 may execute the reuse hint generation module 149*c*_5 to generate a hint that may be recommended according to a frequency of use. For example, the processor 150 may execute the reuse hint generation module 149*c*_5 to generate a hint based on a use pattern of the user.

According to an embodiment, the introduction hint generation module 149*c*_6 may generate a hint that introduces, to the user, a new function or a function frequently used by other users. For example, the hint to introduce a new function may include an introduction (e.g., an operation method) to the intelligence agent 145.

According to another embodiment, the context hint generation module 149*c*_2, condition checking module 149*c*_3, condition model module 149*c*_4, reuse hint generation module 149*c*_5, or introduction hint generation module 149*c*_6 of the proposal module 149*c* may be included in the personalization information server 300. For example, the processor 150 may receive a hint from the context hint generation module 149*c*_2, the reuse hint generation module 149*c*_5, or the introduction hint generation module 149*c*_6 of the user personalization information server 300 and may provide the received hint to the user, via the hint providing module 149*c*_1 of the proposal module 149*c*.

According to an embodiment, the user terminal 100 may provide the hint according to the following sequence of processes. For example, if a hint providing request is received from the intelligence agent 145, the processor 150 may transfer a hint generation request to the context hint generation module 149c_2 via the hint providing module 149c_1. In the hint generation request is received, the processor 150 may receive information corresponding to the current state from the context module 149a and the persona module 149b via the condition checking module 149c_3. The processor 150 may transfer the received information to the condition model module 149c_4 via the condition checking module 149c_3, and may assign priorities to hints in a descending order of availability for the condition from among hints provided to the user, by using the information via the condition model module 149c_4. The processor 150 may check (⑥) the condition via the context hint generation module 149c_2 and may generate hints corresponding to the current state. The processor 150 may transfer the generated hints to the hint providing module 149c_1 via the context hint generation module 149c_2. The processor 150 may arrange the hints according to a rule specified via the hint providing module 149c_1 and may transfer the hints to the intelligence agent 145.

According to an embodiment, the processor 150 may generate a plurality of context hints via the hint providing module 149c_1, and may prioritize the plurality of context hints according to the specified rule. According to an embodiment, the processor 150 may first provide the user with a higher priority among the plurality of context hints via the hint providing module 149c_1.

According to an embodiment, the user terminal 100 may propose a hint in accordance with a use frequency. For example, if a hint providing request is received from the intelligence agent 145, the processor 150 may transfer a hint generation request to the reuse hint generation module 149c_5 via the hint providing module 149c_1. If the hint generation request is received, the processor 150 may receive user information from the persona module 149b via the reuse hint generation module 149c_5. For example, the processor 150 may receive, via the reuse hint generation module 149c_5, a pass rule included in the user's preference information, a parameter included in the pass rule, an execution frequency of an app, and spatiotemporal information of the app, which are associated with the persona module 149b. The processor 150 may generate hints corresponding to the received user information via the reuse hint generation module 149c_5. The processor 150 may transfer the generated hints to the hint providing module 149c_1 via the reuse hint generation module 149c_5. The processor 150 may arrange the hints via the hint providing module 149c_1 and may transfer the hints to the intelligence agent 145.

According to an embodiment, the user terminal 100 may propose a hint for a new function. For example, if a hint providing request is received from the intelligence agent 145, the processor 150 may transfer a hint generation request to the introduction hint generation module 149c_6 via the hint providing module 149c_1. The processor 150 may transfer an introduction hint providing request from the proposal server 400 via the introduction hint generation module 149c_6, and may receive, from the proposal server 400, information on a function to be introduced. The proposal server 400 may store, for example, information on the function to be introduced, and a hint list for the function to be introduced may be updated by a service operator. The processor 150 may transfer the generated hints to the hint providing module 149c_1 via the introduction hint generation module 149c_6. The processor 150 may arrange the hints via the hint providing module 149c_1 and may transmit (⑥) the hints to the intelligence agent 145.

Accordingly, the processor 150 may provide the user with hints generated by the context hint generation module 149c_2, the reuse hint generation module 149c_5, or the introduction hint generation module 149c_6, via the proposal module 149c. For example, the processor 150 may display the generated hints via the proposal module 149c to the app that operates the intelligence agent 145, and may receive an input for selecting the hints from the user via the app.

Figure 6:
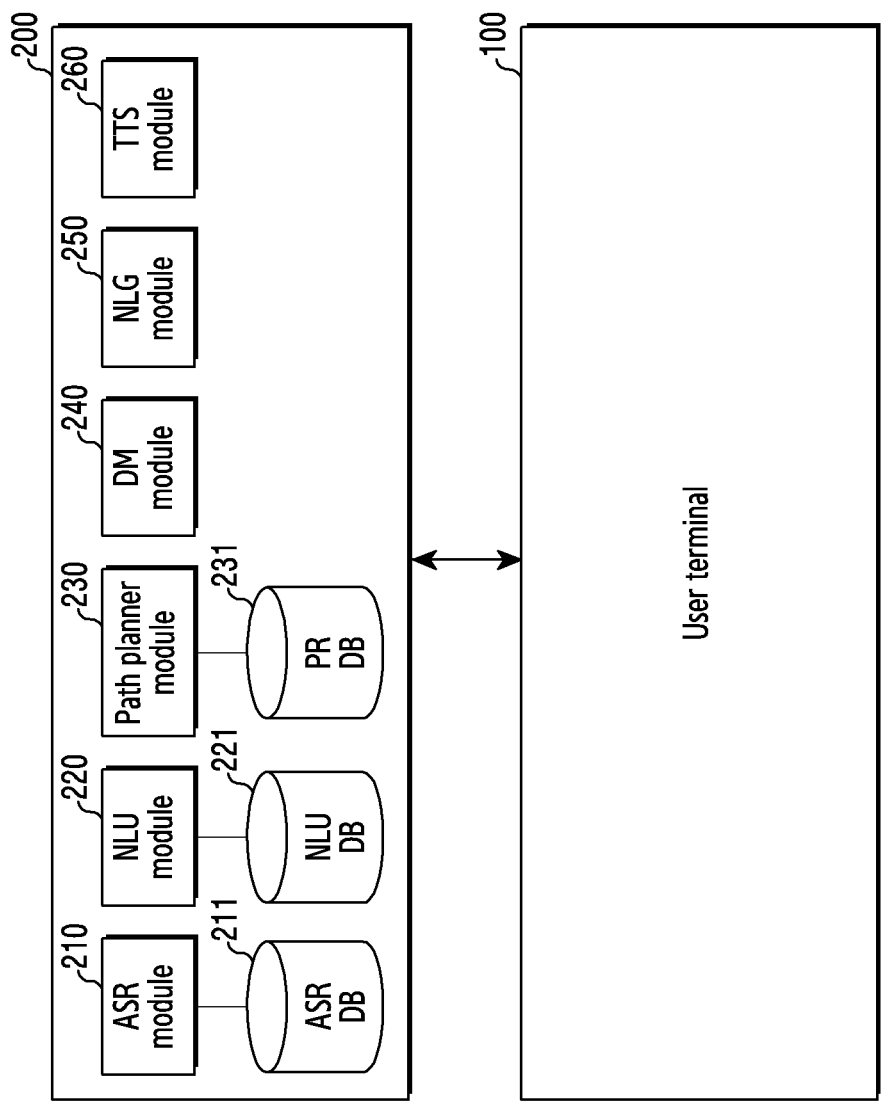
FIG. 6 is a block diagram illustrating an intelligence server of the integrated intelligence system according to an embodiment of the disclosure.

FIG. 6 is a block diagram illustrating a server of the integrated intelligence system according to an embodiment.

Referring to FIG. 6, the intelligence server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to an embodiment, the intelligence server 200 may include a communication circuit, a memory, and a processor. The processor may execute instructions stored in the memory so as to operate the automatic speech recognition module 210, the natural language understanding module 220, the pass planner module 230, the dialogue manager module 240, the natural language generation module 250, and the text-to-speech module 260. The intelligence server 200 may transmit data (or information) to or receive data (or information) from an external device (e.g., the user terminal 100) via the communication circuit.

The natural language understanding module 220 or the path planner module 230 of the intelligence server 200 may generate a path rule.

According to an embodiment, the automatic speech recognition (ASR) module 210 may convert a user input received from the user terminal 100 into text data.

According to an embodiment, the automatic speech recognition module 210 may convert the user input received from the user terminal 100 into text data. For example, the automatic speech recognition module 210 may include an utterance recognition module. The speech recognition module may include an acoustic model and a language model. For example, the acoustic model may include information related to vocalization, and the language model may include unit phoneme information and information on a combination of unit phoneme information. The speech recognition module may convert a user utterance into text data by using information on vocalization and unit phonemic information. The information on the acoustic model and the language model may be stored in, for example, an automatic speech recognition database 211 (ASR DB).

According to an embodiment, the natural language understanding module 220 may perform a syntactic analysis or a semantic analysis to identify user intent. The syntactic analysis may divide a user input into syntactic units (e.g., words, phrases, morphemes, etc.) and may determine what syntactic elements the divided units have. The semantic analysis may be performed using semantic matching, rule matching, formula matching, or the like. Accordingly, the natural language understanding module 220 may obtain a domain, intent, or parameter (or slot) required to express the intent, via the user input.

According to an embodiment, the natural language understanding module 220 may determine a user intent and parameters by using matching rules that are divided into a domain, an intent, and a parameter (or a slot) required to identify the intent. For example, the domain (e.g., alarm) may include multiple intents (e.g., alarm setting, alarm cancellation, etc.), and the intent may include multiple parameters (e.g., time, number of repetitions, alarm sound, etc.). The multiple rules may include, for example, one or more mandatory element parameters. The matching rule may be stored in a natural language understanding database (NLU DB) 221.

According to an embodiment, the natural language understanding module 220 may identify the meaning of a word extracted from a user input, by using linguistic features (e.g., grammatical elements), such as morphemes, phrases, etc., and the user intent may be determined by matching the identified meaning of the word with the domain and the intent. For example, the natural language understanding module 220 may determine the user intent by calculating the number of words extracted from the user input, which are included in each domain and intent. According to an embodiment, the natural language understanding module 220 may determine a parameter of the user input by using a word that is the basis for identifying the intent. According to an embodiment, the natural language understanding module 220 may determine the user intent by using the natural language recognition database 221 in which a linguistic characteristic for identifying the intent of the user input is stored. According to another embodiment, the natural language understanding module 220 may determine the user intent by using a personalized language model (PLM). For example, the natural language understanding module 220 may determine the user intent by using personalized information (e.g., a contact list and a music list). The personalized language model may be stored, for example, in the natural language recognition database 221. According to an embodiment, not only the natural language understanding module 220 but also the automatic speech recognition module 210 may recognize a user's speech by referring to the personalized language model stored in the natural language recognition database 221.

According to an embodiment, the natural language understanding module 220 may generate a path rule on the basis of the parameter and intent of the user input. For example, the natural language understanding module 220 may select an app to be executed, on the basis of the intent of the user input, and may determine an operation to be performed by the selected app. The natural language understanding module 220 may generate a path rule by determining a parameter corresponding to the determined operation. According to an embodiment, the pass rule generated by the natural language understanding module 220 may include information on an app to be executed, an operation to be performed in the app (e.g., at least one state), and a parameter required to perform the operation.

According to an embodiment, the natural language understanding module 220 may generate one path rule or multiple path rules on the basis of the user intent and the parameter. For example, the natural language understanding module 220 may receive a path rule set corresponding to the user terminal 100 from the path planner module 230, and may map the parameter and the intent of the user input to the received path rule set, so as to determine a path rule.

According to another embodiment, the natural language understanding module 220 may determine an app to be executed, an operation to be performed in the app, and a parameter required to perform the operation, on the basis of the parameter and the intent of the user input, so as to generate one path rule or multiple path rules. For example, the natural language understanding module 220 may arrange, by using information of the user terminal 100, the app to be executed and the operation to be executed in the app, in the form of an ontology or graph model according to the intent of the user input, so as to generate a path rule. The generated path rule may be stored in a path rule database (PR DB) 231 via, for example, the path planner module 230. The generated path rule may be added to the path rule set of database 231.

According to an embodiment, the natural language understanding module 220 may select at least one path rule among the multiple generated path rules. For example, the natural language understanding module 220 may select an optimum path rule of the multiple path rules. For another example, the natural language understanding module 220 may select multiple path rules if only a part of operations is specified based on a user utterance. The natural language understanding module 220 may determine one path rule among the multiple path rules by an additional user input.

According to an embodiment, the natural language understanding module 220 may transmit a path rule to the user terminal 100 in response to the user input. For example, the natural language understanding module 220 may transmit one path rule corresponding to the user input to the user terminal 100. For another example, the natural language understanding module 220 may transmit multiple path rules corresponding to the user input to the user terminal 100. The multiple path rules may be generated by the natural language understanding module 220, for example, if only a part of operations is specified based on the user utterance.

According to an embodiment, the path planner module 230 may select at least one path rule among multiple path rules.

According to an embodiment, the path planner module 230 may transfer a path rule set including multiple path rules to the natural language understanding module 220. The multiple path rules of the path rule set may be stored in the form of a table in the path rule database 231 connected to the path planner module 230. For example, the path planner module 230 may transfer a path rule set corresponding to information (e.g., OS information and app information) of the user terminal 100, which is received from the intelligence agent 145, to the natural language understanding module 220. A table stored in the path rule database 231 may be stored, for example, for each domain or domain version.

According to an embodiment, the path planner module 230 may select one path rule or multiple path rules from the path rule set, and may transfer the selected path rule or path rules to the natural language understanding module 220. For example, the path planner module 230 may select one path rule or multiple path rules by matching the parameter and user intent to the path rule set corresponding to the user terminal 100, and may transfer the selected rule path or rule paths to the natural language understanding module 220.

According to an embodiment, the path planner module 230 may generate one path rule or multiple path rules on the basis of the user intent and the parameter. For example, the path planner module 230 may generate one path rule or multiple path rules by determining an app to be executed and an operation to be executed in the app, on the basis of the user intent and the parameter. According to an embodiment, the path planner module 230 may store the generated path rule in the path rule database 231.

According to an embodiment, the path planner module 230 may store, in the path rule database 231, a path rule generated by the natural language understanding module 220. The generated path rule may be added to the path rule set stored in the path rule database 231.

According to an embodiment, the table stored in the path rule database 231 may include multiple path rules or multiple path rule sets. The multiple path rules or multiple path rule sets may reflect a kind, version, type, or characteristic of a device that executes each path rule.

According to an embodiment, the dialogue manager module 240 may determine whether the user intent identified by the natural language understanding module 220 is clear. For example, the dialogue manager module 240 may determine whether the user intent is clear, on the basis of whether parameter information is sufficient. The dialogue manager module 240 may determine whether the parameter identified by the natural language understanding module 220 is sufficient to perform a task. According to an embodiment, the dialogue manager module 240 may perform feedback for requesting of information necessary for a user when the user intent is not clear. According to an embodiment, the dialogue manager module 240 may perform feedback for requesting of parameter information for identification of the user intent.

According to an embodiment, the dialogue manager module 240 may include a content provider module. If the content provider module is capable of performing an operation on the basis of the parameter and intent identified by the natural language understanding module 220, the content provider module may generate a result of performing a task corresponding to the user input. According to an embodiment, the dialogue manager module 240 may transmit the result generated by the content provider module to the user terminal 100 in response to the user input.

According to an embodiment, the natural language generation module (NLG) 250 may change specified information into a text form. The information changed into the text form may be a form of a natural language utterance. The specified information may be, for example, information of an additional input, information to inform completion of the operation corresponding to the user input, or information (e.g., feedback information for a user input) directing an additional input of the user. The information changed into the text form may be transmitted to the user terminal 100 and displayed on the display 120, or may be transmitted to the text-to-speech module 260 and converted into a speech form.

According to an embodiment, the text-to-speech module 260 may change information in the text form to information in the speech form. The text-to-speech module 260 may receive text-form information from the natural language generation module 250, and may change the text-form information into speech-form information, so as to transmit the speech-form information to the user terminal 100. The user terminal 100 may output the speech-form information to the speaker 130.

According to an embodiment, the natural language understanding module 220, the path planner module 230, and the dialogue manager module 240 may be implemented as a single module. For example, the natural language understanding module 220, the path planner module 230, and the dialogue manager module 240 may be implemented as a single module to determine a parameter and user intent, and may generate a response (e.g., a path rule) corresponding to the parameter and the user intent. Accordingly, the generated response may be transmitted to the user terminal 100.

Figure 7:
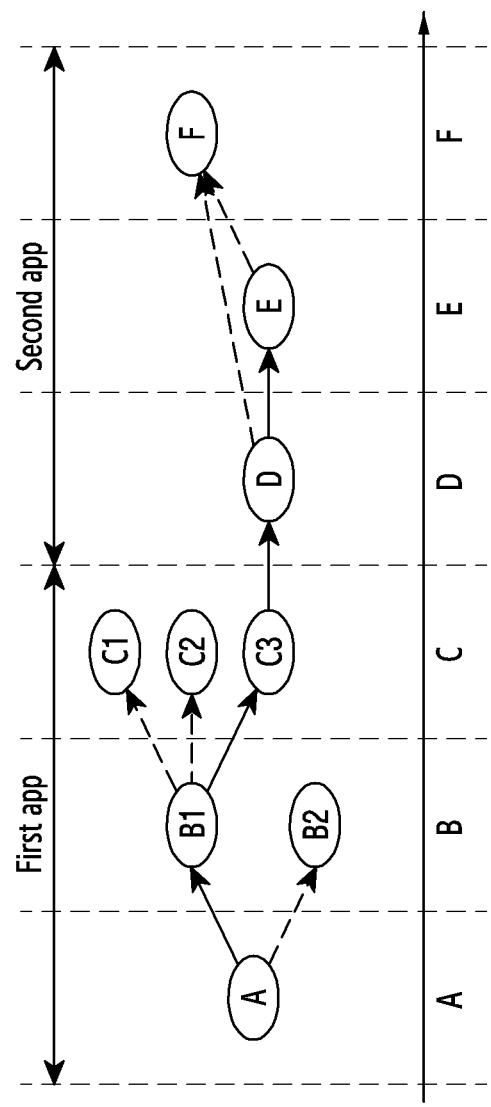
FIG. 7 is a diagram illustrating a method of generating a path rule by a path natural language understanding (NLU) module according to an embodiment of the disclosure.

FIG. 7 is a diagram illustrating a method of generating a path rule by a path planner module according to an embodiment.

Referring to FIG. 7, according to an embodiment, the natural language understanding module 220 may classify a function of an app as one of operations (e.g., state A to state F) and may store the classified function in the pass rule database 231. For example, the natural language understanding module 220 may store, in the pass rule database 231, a pass rule set including a plurality of pass rules (A-B1-C1, A-B1-C2, A-B1-C3-D-F, and A-B1-C3-D-E-F) classified into one (e.g., state) of operations.

According to an embodiment, the path rule database 231 of the path planner module 230 may store a path rule set for execution of a function of the app. The path rule set may include a plurality of path rules including a plurality of operations (e.g., a sequence of states). In the plurality of path rules, operations executed according to parameters, which are input to the plurality of respective operations, may be sequentially arranged. According to an embodiment, the plurality of path rules may be configured in an ontology or graph model form and stored in the path rule database 231.

According to an embodiment, the natural language understanding module 220 may select an optimum path rule (A-B1-C3-D-F) from among the plurality of path rules (A-B1-C1, A-B1-C2, A-B1-C3-D-F, and A-B1-C3-D-E-F) corresponding to a parameter and an intent of a user input.

According to an embodiment, the natural language understanding module 220 may transfer a plurality of rules to the user terminal 100 if there is no path rule that perfectly matches the user input. For example, the natural language understanding module 220 may select a path rule (e.g., A-B1) partially corresponding to the user input. The natural language understanding module 220 may select one or more path rules (e.g., A-B1-C1, A-B1-C2, A-B1-C3-D-F, and A-B1-C3-D-E-F) including the path rule (e.g., A-B1) partially corresponding to the user input, so as to transfer the selected path rules to the user terminal 100.

According to an embodiment, the natural language understanding module 220 may select one of multiple path rules on the basis of an additional input of the user terminal 100, and may transfer the selected one path rule to the user terminal 100. For example, the natural language understanding module 220 may select one path rule (e.g., A-B1-C3-D-F) from among the plurality of path rules (e.g., A-B1-C1, A-B1-C2, A-B1-C3-D-F, and A-B1-C3-D-E-F) according to a user input (e.g., an input to select C3) additionally input by the user terminal 100, and may transmit the selected one path rule to the user terminal 100.

According to another embodiment, the natural language understanding module 220 may determine a parameter or user intent corresponding to the user input (e.g., an input to select C3) additionally input to the user terminal 100 via the natural language understanding module 220, and may transmit the determined user intent and parameter to the user terminal 100. The user terminal 100 may select one path rule (e.g., A-B1-C3-D-F) from among the plurality of path rules (e.g., A-B1-C1, A-B1-C2, A-B1-C3-D-F, and A-B1-C3-D-E-F) on the basis of the transmitted intent or parameter.

Accordingly, the user terminal 100 may complete the operation of the apps 141 and 143 by the selected one path rule.

According to an embodiment, if a user input having insufficient information is received by the intelligence server 200, the natural language understanding module 220 may generate a path rule partially corresponding to the received user input. For example, the natural language understanding module 220 may transmit the partially corresponding pass rule to the intelligence agent 145. The processor 150 may execute the intelligence agent 145 to receive the pass rule, and may transfer the partially corresponding pass rule to the execution manager module 147. The processor 150 may execute the first app 141 according to the path rule via the execution manager module 147. The processor 150 may transmit information on an insufficient parameter to the intelligence agent 145 while executing the first app 141 via the execution manager module 147. The processor 150 may request an additional input from the user by using information on the insufficient parameter via the intelligence agent 145. If an additional input is received by the user via the intelligence agent 145, the processor 150 may transmit the user input to the intelligence server 200 and process the user input. The natural language understanding module 220 may generate an additional pass rule on the basis of parameter information and an intent of the user input that is additionally input, and may transmit the additional path rule to the intelligence agent 145. The processor 150 may transmit the pass rule to the execution manager module 147 via the intelligence agent 145 to execute the second app 143.

According to an embodiment, if the intelligence server 200 receives a user input, in which a part of information has been omitted, the natural language understanding module 220 may transmit a user information request to the personalization information server 300. The personalization information server 300 may transmit, to the natural language understanding module 220, user information obtained by inputting the user input stored in the persona database. The natural language understanding module 220 may select a path rule corresponding to the user input, in which a part of information has been omitted, by using the user information. Accordingly, even if the intelligence server 200 receives the user input, in which a part of information has been omitted, the natural language understanding module 220 may determine the path rule corresponding to the user input by requesting the omitted information so as to receive an additional input or by using the user information.

Table 1 attached below may represent an exemplary form of a pass rule related to a task requested by a user according to an embodiment.

TABLE 1

| Path rule ID | State | parameter |
| --- | --- | --- |
| Gallery_101 | pictureView(25) | NULL |
| | searchView(26) | NULL |
| | searchViewResult(27) | Location,time |
| | SearchEmptySelectedView(28) | NULL |
| | SearchSelectedView(29) | ContentType,selectall |
| | CrossShare(30) | anaphora |

Referring to Table 1, a pass rule generated or selected in an intelligence server (the intelligence server 200 of FIG. 1) according to a user utterance (e.g., "Share the photo") may include at least one state (25, 26, 27, 28, 29 or 30). For example, the at least one state (e.g., one operation state of a terminal) may correspond to at least one of an execution of a photo application (PicturesView) 25, an execution of a photo search function (SearchView) 26, an output of a search result display screen (SearchViewResult) 27, an output of a display screen for a search result having no selected photo (SearchEmptySelectedView) 28, an output of a display screen for a search result having at least one selected photo (SearchSelectedView) 29, or an output of a shared application selection screen (CrossShare) 30.

In an embodiment, parameter information of the pass rule may correspond to at least one state. For example, the parameter information of the pass rule may be included in a state corresponding to the output 29 of a display screen for a search result having at least one selected photo.

As a result of execution of the pass rule including the sequence of the states (25, 26, 27, 28, and 29), the task requested by the user (e.g., "Share the photo!") may be performed.

Figure 8:
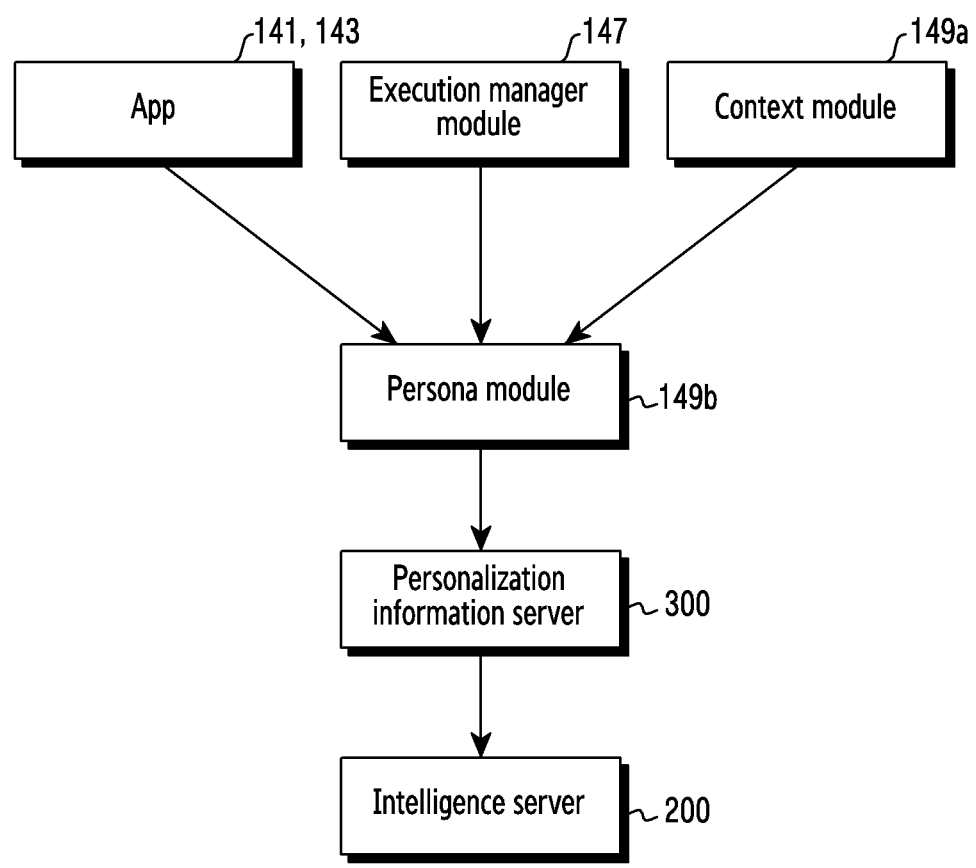
FIG. 8 is a diagram illustrating management of user information by a persona module of the intelligence service module according to an embodiment of the disclosure.

FIG. 8 is a diagram illustrating management of user information by a persona module of the intelligence service module according to an embodiment of the disclosure.

Referring to FIG. 8, the processor 150 may receive information of the user terminal 100 from the apps 141 and 143, the execution manager module 147, or the context module 149a via the persona module 149b. The processor 150 may store, via the apps 141 and 143 and the execution manager module 147, information on a result of executing operations 141b and 143b of the apps in an operation log database. The processor 150 may store information on a current state of the user terminal 100 in the context database via the context module 149a. The processor 150 may receive the stored information from the operation log database or the context database via the persona module 149b. Data stored in the operation log database and the context database may be analyzed by, for example, an analysis engine, and may be transferred to the persona module 149b.

According to an embodiment, the processor 150 may transmit the information received from the apps 141 and 143, the execution manager module 147, or the context module 149a to the proposal module 149c via the persona module 149b. For example, the processor 150 may transfer data stored in the operation log database or the context database to the proposal module 149c via the persona module 149b.

According to an embodiment, the processor 150 may transmit the information received from the apps 141 and 143, the execution manager module 147, or the context module 149a to the personalization information server 300 via the persona module 149b. For example, the processor 150 may periodically transmit data accumulated and stored in the operation log database or the context database to the personalization information server 300 via the persona module 149b.

According to an embodiment, the persona module 149b may transfer data stored in the operation log database or the context database to the proposal module 149c via the persona module 149b. User information generated by the persona module 149b may be stored in the persona database. The persona module 149b may periodically transmit the user information stored in the persona database to the personalization information server 300. According to an embodiment, the information transmitted by the persona module 149b to the personalization information server 300 may be stored in the persona database. The personalization information server 300 may infer user information necessary for generation of a path rule of the intelligence server 200, by using the information stored in the persona database.

According to an embodiment, the user information inferred using information transmitted by the persona module 149b may include profile information or preference information. The profile information or the preference information may be inferred from a user's account and accumulated information.

The profile information may include personal information of the user. For example, the profile information may include demographic information of the user. The demographic information may include, for example, gender, age, etc. of the user. For another example, the profile information may include life event information. The life event information may be, for example, inferred by comparing log information with a life event model, and may be reinforced by analyzing a behavior pattern. For another example, the profile information may include interest information. The interest information may include, for example, an interested shopping item, an interested field (e.g., sports, politics, etc.), and the like. For another example, the profile information may include activity region information. The activity region information may include, for example, information of home, a work place, and the like. The activity region information may include information on a region, in which priority is recorded based on a cumulative stay time and the number of visits as well as information on a location of a place. For another example, the profile information may include activity time information. The activity time information may include, for example, information of wake-up time, commuting time, sleep time, and the like. The information of commuting time may be inferred using the activity region information (e.g., information of home and a work place). The information of sleeping time may be inferred from time during which the user terminal 100 is not used.

The preference information may include user preference information. For example, the profile information may include information on an app preference. The app preference may be inferred from, for example, a use history of the app (e.g., time-specific and place-specific use records). The app preference may be used to determine an app to be executed according to a current state (e.g., time and place) of the user. For another example, the preference information may include contact preference information. A contact preference may be inferred by, for example, analyzing a contact frequency for contact information (e.g., a time-specific contact frequency and a place-specific contact frequency). The contact preference may be used to determine contact information for contact according to the current state of the user (e.g., contact for duplicate names). For another example, the preference information may include setting information. The setting information may be inferred by, for example, analyzing configuration frequency information (e.g., a frequency of performing configuration to a setting value specific to time and place) of a specific setting value. The setting information may be used to configure a specific setting value according to the current state (e.g., time, place, and situation) of a user. For another example, the preference information may include a place preference. The place preference may be inferred from, for example, a visit record (e.g., a visit record specific to time) of a specific place. The place preference may be used to determine a place to be visited according to the current state (e.g., time) of the user. For another example, the preference information may include a command preference. The command preference may be inferred from, for example, a command use frequency (e.g., a use frequency specific to time and place). The command preference may be used to determine an instruction pattern to be used according to the current state (e.g., time and place) of the user. Particularly, the command preference may include information on a menu most frequently selected by the user in the current state of the app that is being executed according to analysis of the log information.

Figure 9:
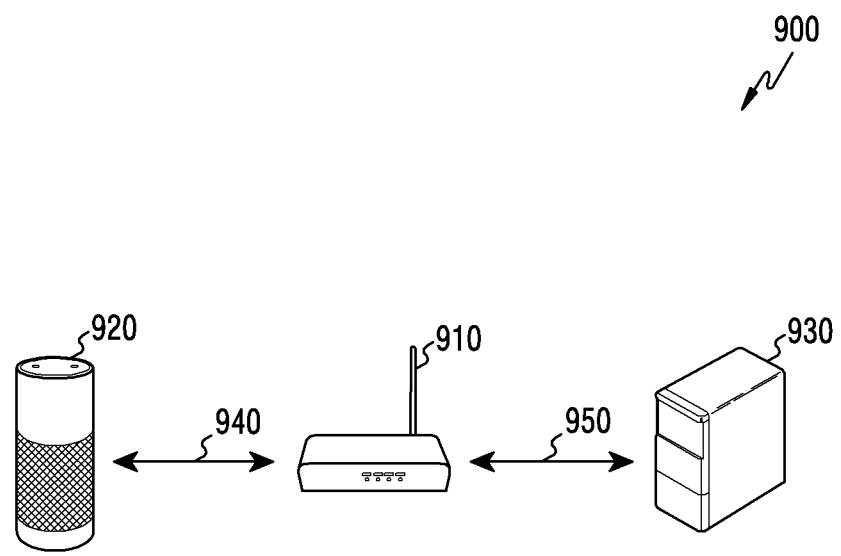
FIG. 9 illustrates a network setup system according to various embodiments of the disclosure.

FIG. 9 illustrates a network setup system according to various embodiments of the disclosure.

Referring to FIG. 9, a network setup system 900 according to various embodiments of the disclosure may include an electronic device 910, a first external device 920, and a second external device 930. The network setup system 900 may refer to a system for network setup of the first external device 920.

In an embodiment, the network setup system 900 according to various embodiments of the disclosure may be applied in a Wi-Fi or wireless LAN-based wireless network environment.

In an embodiment, the first external device 920 may be an IoT device including a sensor function and a communication function. For example, the first external device 920 may be at least one of a refrigerator, an air conditioner, a TV, a light bulb, a vacuum cleaner, an integrated remote controller, or a speaker, and the above-described examples are merely examples for ease of understanding and do not limit the first external device 920.

In an embodiment, the first external device 920 may be a device including a built-in microphone and speaker.

In an embodiment, the first external device 920 may support a voice interaction function with a user by means of the built-in microphone and speaker. For example, the first external device 920 may receive a speech utterance of the user by means of an activated microphone or may provide a speech output to the user by means of an activated speaker.

In an embodiment, the first external device 920 may be connected to the electronic device 910 via a first network 940. For example, by transmitting a connection request signal including a service set identifier (SSID) of the first network 940 to the electronic device 910, the first external device 920 may attempt to connect to the electronic device 910 via the first network 940. For example, the first network 940 may be a local network, such as a home network.

The SSID of the first network 940 may be identification information of the first network 940, which distinguishes the first network 940 from another network (e.g., a second network 950). For example, a type of the SSID may be an IP (e.g., 127.0.0.1) or a combination of one or more characters and numbers.

In an embodiment, the first network 940 may be a hidden network. The hidden network may be a network in which an SSID of the network is not disclosed.

In an embodiment, the first external device 920 may be connected to the second network 950 via the electronic device 910. The second network 950 is an external network separate from a local network, and may be a backhaul network. For example, after the first external device 920 is determined to be a device for which access is allowed by the electronic device 910 (for example, after the first external device 920 is registered in an access control list (ACL) of the electronic device 910), the first electronic device 920 may be connected to the second network 950 via the electronic device 910. The access control list of the electronic device 910 may be a list of devices allowed to be connected to the second network 950. Herein, the electronic device 910 may perform only a routing function of configuring a path of a data packet.

In an embodiment, in order for the first external device 920 to be determined as a device for which access is allowed by the electronic device 910, the first external device 920 or a user of the first external device may be required to be authenticated by the electronic device 910 or the second external device 930. To this end, it may be necessary for the first external device 920 to access the electronic device 910 and exchange information required for authentication of the first external device 920 with the accessed electronic device 910.

In an embodiment, the first external device 920 may transmit the information related to authentication to the electronic device 910. For example, the first external device 920 may transmit, to the electronic device 910, the information related to authentication recognized (or acquired) via a voice interaction with the user. In another embodiment, the first external device 920 may receive the information related to authentication from the electronic device 910. For example, the first external device 920 may receive, from the electronic device 910, an authentication message for authentication of the first external device 920 or the user of the first external device 920, and may provide the received authentication message to the user by using an activated speaker. The authentication message may be a voice message. The authentication message may be generated by the electronic device 910 or the second external device 930. For another example, the first external device 920 may receive information related to authentication, which is corresponding to the provided authentication message, from the user by means of the activated microphone, and may transmit the received information to the electronic device 910. The information related to the authentication, which is related to the provided authentication message, may be a speech utterance of the user.

The second external device 930 may be a device that authenticates the first external device 920 by using user speech utterance data which is input from the first external device 920. The second external device 930 may be a server device that authenticates one client (e.g., the first external device 920) among a plurality of clients by using the user speech utterance data that is input from the client.

In an embodiment, in order to authenticate the first external device 920 by using the user speech utterance data that is input from the first external device 920, the second external device 930 may include a plurality of modules for processing speech data and/or natural language data. For example, the second external device 930 may include an automatic speech recognition (ASR) module that converts user speech utterance data into text data, a natural language understanding (NLU) module that analyzes converted text data syntactically or semantically so as to identify a user intent, and a natural language generator (NLG) module that changes designated information to a text form, and a text-to-speech (TTS) module.

In an embodiment, the second external device 930 may indicate a set of multiple servers (e.g., a cloud server), which perform different functions respectively, and may indicate a single server that integrally perform a plurality of functions. For example, the second external device 930 may indicate a set of multiple servers corresponding to the described plurality of modules. For another example, the second external device 930 may indicate a set of an intelligence server (e.g., the intelligence server 200) that manages speech recognition and control, an IoT server that manages configurations and operations of a plurality of clients (a plurality of IoT devices, for example, the first external device 920), and an account server that manages authentication of a client or a user of the client.

In an embodiment, the second external device 930 may perform functions corresponding to the described plurality of modules, by using various algorithms of machine learning, such as an artificial neural network and a support vector machine.

The electronic device 910 may be a device that connects different networks. The electronic device 910 may be a device that connects the first network 940 and the second network 950. For example, the electronic device 910 may transmit a network packet received from the first external device 920 via the first network, to the second external device 930 via the second network. For another example, the electronic device 910 may be a device, i.e., a router, which routes data transmission between at least two external devices (e.g., the first external device 920 and the second external device 930).

In an embodiment, the electronic device 910 may be a device that routes data exchange between the first external device 920 and the second external device 930 in order to determine whether to connect the first external device 920 to the second network 950. For example, the electronic device 910 may transmit, to the first external device 920, information required for authentication of the first external device 920 by the second external device 930. For another example, the electronic device 910 may receive a response to the required information from the first external device 920, and may transmit the received response to the second external device 930.

In an embodiment, the electronic device 910 may or may not connect the first external device 920 to the second network 950 on the basis of information (or message) received from the second external device 930. For example, if the electronic device 910 receives, from the second external device 930, a message indicating that authentication of the first external device 920 has failed, despite a request for a connection of the first external device 920 to the second network 950, the first external device 920 may not be connected to the second network 950. For another example, if the electronic device 910 receives, from the second external device 930, a message indicating that authentication of the first external device 920 is successful, the electronic device 910 may register identification information (e.g., a MAC address) of the first external device 920 in the access control list and may transmit, to the first external device 920, a signal for requesting of roaming from the first network 940 to the second network 950. After the first external device 920 is registered in the access control list of the electronic device 910, the first external device 920 may be connected to the second network 950.

In an embodiment, the electronic device 910 may include a plurality of devices. For example, the electronic device 910 may include a first router and a second router.

Figure 10:
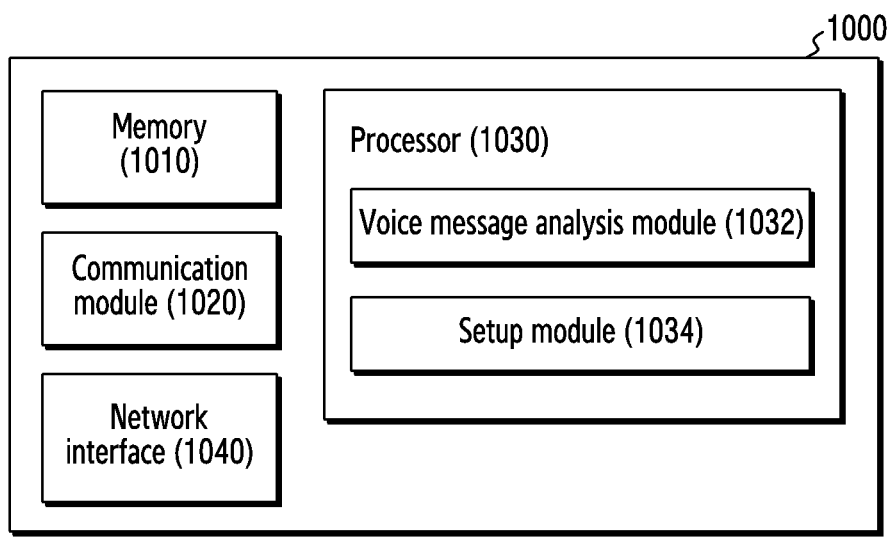
FIG. 10 illustrates a functional configuration of an electronic device according to various embodiments of the disclosure.

FIG. 10 illustrates a functional configuration of an electronic device according to various embodiments of the disclosure.

According to an embodiment, an electronic device 1000 may be the electronic device 910 of FIG. 9.

Referring to FIG. 10, the electronic device 1000 may include a communication module 1020, a memory 1010, a processor 1030, and a network interface 1040.

The communication module 1020 may provide at least one wireless network to an external device (e.g., the first external device 920) under a control of the processor 1030. For example, the communication module 1020 may provide the first external device 920 with at least one network of the first network 940 or the second network 950. In an embodiment, the communication module 1020 may include a wireless communication circuit.

Under the control of the processor 1030, the network interface 1040 may transmit data, which is generated by the electronic device 1000 or stored in the electronic device 1000, to an external device (e.g., the server 930), and may receive data, which is generated by the external device or stored in the external device. For example, the electronic device 1000 may transmit user account information and/or device information of the first external device 920 to the server 930 via the network interface 1040. For example, the electronic device 1000 may receive information on a setup utterance associated with the user account information from the server 930 via the network interface 1040.

Under the control of the processor 1030, the memory 1010 may at least temporarily store data which is generated by the electronic device 1000 or transmitted from an external device (e.g., the first external device 920). For example, the memory 1010 may store information on an SSID of the first network 940. For another example, the memory 1010 may store information on an access control list of the electronic device 1000.

In an embodiment, the memory 1010 may store device information of a plurality of devices connected to the electronic device 1000. For example, the memory 1010 may include at least one of user account information, input/output attribute information, or identification information of a third electronic device (not illustrated) for which a network setup is in progress or has been completed.

In an embodiment, the memory 1010 may store account information of a user. The memory 1010 may store account information of a user (e.g., user A) designated to the electronic device 1000. For example, a user's account designated to the electronic device 1000 may be an account that is input from the user when the electronic device 1000 is first installed.

In an embodiment, the memory 1010 may store, in the electronic device 1000, account information of a platform (or a company) operating embodiments of the disclosure or an account of a manufacturer of the electronic device 1000 of a designated user (e.g., user A).

In an embodiment, account information of the designated user (e.g., user A) may include information for determining whether a user of a certain external device (e.g., the first external device 920) is the same user as user A or a user associated with user A. For example, the account information of user A may include an account password of user A or information that is known to only user A (e.g., personal information, such as age, date of birth, etc. of user A, information on an electronic device currently owned by user A, or the like).

The processor 1030 may operatively connected to the communication module 1020 and the memory 1010. The processor 1030 may include a voice message analysis module 1032 and a setup module 1034.

The voice message analysis module 1032 may be an analysis module that provides a service based on a user speech.

In an embodiment, the voice message analysis module 1032 may be a module that relays a voice message exchanged between the first external device 920 and the second external device 930. For example, the voice message analysis module 1032 may transfer user speech utterance data received from the first external device 920 to the second external device 930. For another example, the voice message analysis module 1032 may transfer, to the first external device 920, a voice message (e.g., a welcome message or a voice message provided, for the first time, to the first external device 920 connected to the electronic device 910 via the first network 940; Details will be described later) received from the second external device 930.

In an embodiment, the voice message analysis module 1032 may check a form or format of a message received from the first external device 920 or the second external device 930. The voice message analysis module 1032 may perform different operations according to a checked result. For example, the voice message analysis module 1032 may determine whether the message received from the second external device 930 is a voice message. If the received message is a voice message, the voice message analysis module 1032 may transmit the received message to the first external device 920. If the received message is not a voice message (e.g., in a case of a control command for the electronic device 1000), the electronic device 1000 may not transmit the received message to the first external device 920. The voice message analysis module 1032 may determine whether the received message is a voice message, on the basis of at least one of a flag included in the message received from the second external device 930 and a compression format of data constituting the message.

In an embodiment, the voice message analysis module 1032 may be activated or deactivated based on at least one of messages received from an external electronic device (e.g., the second external device 930) or a message transmitted from the electronic device 1000. For example, in response to the connection of the electronic device 1000 to the first external device 920 via the first network 940 (e.g., in response to transmitting, by the electronic device 1000, an affirmative response message to the first external device 920 having requested the connection to the electronic device 1000 via the first network 940), the processor 1030 may activate the voice message analysis module 1032.

The setup module 1034 may be a module that controls overall operations of the electronic device 1000, which are performed for network setup of the first external device 920. For example, if the communication module 1020 receives device information of the first external device 920 from the first external device 920, the setup module 1034 may activate the voice message analysis module 1032 of the electronic device 1000. For another example, if the electronic device 1000 adds the first external device 920 to the access control list of the electronic device 1000, the setup module 1034 may deactivate the voice message analysis module 1032. For still another example, if the voice message analysis module 1032 receives a welcome message from the second external device 930, the setup module 1034 may control the communication module 1020 so that the received welcome message is transmitted to the first external device 920 via the first network 940.

Figure 11:
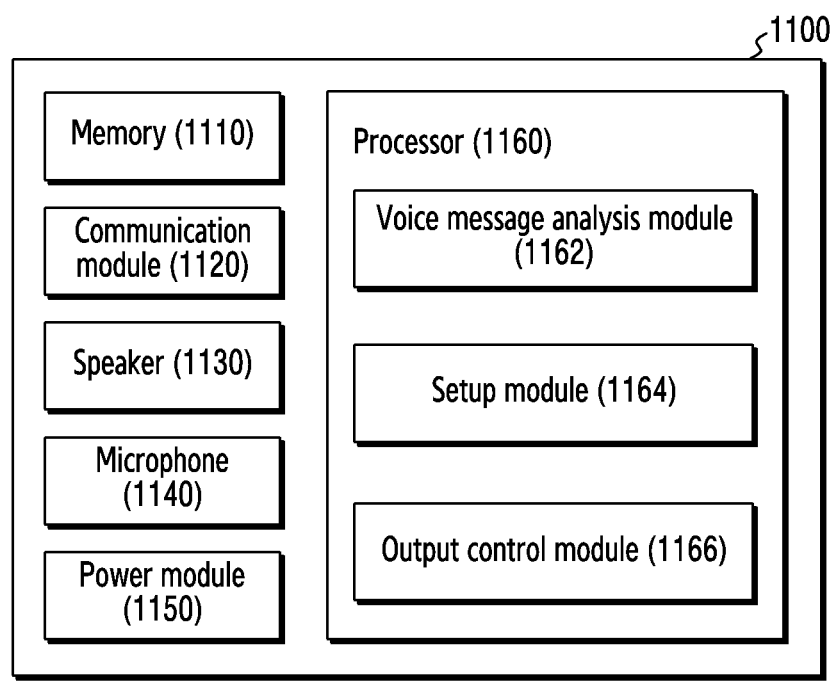
FIG. 11 illustrates a functional configuration of a first external device according to various embodiments of the disclosure.

FIG. 11 illustrates a functional configuration of a first external device 1100 according to various embodiments of the disclosure.

In an embodiment, the first external device 1100 may be the first external device 920 of FIG. 9.

Referring to FIG. 11, the first electronic device 1100 may include a memory 1100, a communication module 1120, a speaker 1130, a microphone 1140, a power module 1150, and a processor 1160.

Under the control of the processor 1160, the memory 1110 may store data which is generated by the first external device 1100 or received from an external device (e.g., the second external device 930). For another example, the memory 1110 may store SSID information related to the electronic device 1000. The SSID information related to the electronic device 1000 may be SSID information of the first network 940 for connection to the electronic device 1000. The SSID information related to the electronic device 1000 may be SSID information of the first network 940 provided by the electronic device 1000. For another example, the memory 1100 may store work log information of the first external device 1100. The memory 1110 may store log information for all work or operations performed by the first external device 1100 from a factory reset state (or an out-of-box state). For another example, the memory 1100 may store account information associated with the first external device 1100. The memory 1110 may store information on a user account designated to the first external device 1100 or a user account associated with the first external device 1100.

Under the control of the processor 1160, the communication module 1120 may transmit data to an external device (e.g., the electronic device 1000) or may receive data from the external device. For example, the first external device 1100 may transmit an SSID search signal of the first network 940 to the electronic device 1000 via the communication module 1120. The SSID search signal of the first network 940 may include the SSID information of the first network 940. For another example, the first external device 1100 may transmit speech utterance data of the first external device 1100 to the electronic device 1000 via the communication module 1120. The speech utterance data of the first external device 1100 may be data for a speech utterance of a user, which is recognized via the microphone 1140 and/or the speaker 1130 of the first external device 1100.

The speaker 1130 and the microphone 1140 may be an input/output device for providing a service based on a user speech. The microphone 1140 may recognize a speech utterance of a user. The speaker 1130 may output speech data generated by the electronic device 1000 or an external device (e.g., the second external device 930). For example, the speaker 1130 may output a voice message, such as "Hello. Device A (e.g., a Wi-Fi speaker) is connected to a power source. Router B of Gil-dong Hong has been detected as a device that can be connected to device A over the network. Are you Gil-dong Hong?". For another example, the speaker 1130 may output a voice message generated by the second external device 930, in response to the speech utterance of the user, which is recognized by the microphone 1140. For example, in response to a user speech utterance, such as "The password is 02843", the speaker 1130 may output a voice message generated by the second external device 930, such as "Congratulations. The network connection of the Wi-Fi speaker is complete".

The power module 1150 may be a module that detects whether external power (e.g., AC power) has been applied to the first external device 1100. For example, if it is detected that external power has been applied to the first external device 1100, the power module 1150 may transmit, to the processor 1160, a signal indicating that the external power has been applied. The processor 1160, which has received, from the power module 1150, the signal indicating that the external power has been applied, may activate the setup module 1164.

The processor 1160 may control overall operations of the first external device 1100. For example, the processor 1160 may control the communication module 1120 to receive data from an external device (e.g., the electronic device 1000) or to transmit data to the external device.

The processor 1160 may include a voice message analysis module 1162, a setup module 1164, and an output control module 1166.

The voice message analysis module 1162 may be a module that provides a service based on a user speech. In an embodiment, the voice message analysis module 1162 may be a module that perform one or more operations related to a user speech utterance received via the microphone 1140. For example, the voice message analysis module 1162 may convert a user speech utterance (e.g., "Play a song") received via the microphone 1140 into a digital signal, may transmit the converted digital signal to an external device (e.g., the second external device 930), and may perform one or more operations (e.g., executing a music playback application) related to the user speech utterance on the basis of a control command received from the external device.

The voice message analysis module 1162 may be a module that analyzes a speech message, which is generated by the first external device 1100 or received from an external device (e.g., the second external device 930), to provide a service based on a user speech.

In an embodiment, the voice message analysis module 1162 may perform a function identical to at least a part of functions of the voice message analysis module 1032 of the electronic device 1000 disclosed in FIG. 10. For example, the voice message analysis module 1162 may check a form or format (e.g., voice) of a message received from an external device (e.g., the second external device 930). The voice message analysis module 1162 may control an output device (e.g., speaker 1130) on the basis of the form or format of the checked message or may transmit a related signal to the output control module 1166 to control an output device (e.g., the microphone 1140). For example, after the first external device 1100 is connected to the second network 950, the voice message analysis module 1162 may determine whether the message received from the second external device 930 is a control command or a voice message, and may perform different functions according to the determination.

In an embodiment, the voice message analysis module 1162 may be activated or deactivated under a predetermined condition. In a case of detecting that the predetermined condition is satisfied, an instruction for activation or deactivation of the voice message analysis module 1162 may be stored in the memory 1100. For example, the voice message analysis module 1162 may be deactivated if the first external device 1100 is connected to the electronic device 1000 via the first network 940 (or a case in which an affirmative response to a request for connection via the first network 940 is received from the electronic device 1000). For another example, the voice message analysis module 1162 may be activated if the first external device 1100 receives access information of the second network 950 (e.g., credential information of the second network 950) from the electronic device 1000.

In an embodiment, the voice message analysis module 1162 may be activated or deactivated based on a control command received from an external device (e.g., the second external device 930).

The setup module 1164 may be a module that sets up a network configuration of the first external device 1100.

In an embodiment, the setup module 1164 may be activated based on a signal received from the power module 1150 by the processor 1160. For example, if the processor 1160 receives, from the power module 1150, a signal indicating that external power has been applied to the first external device 1100, the processor 1160 may activate the setup module 1164.

In an embodiment, the activated setup module 1164 or the processor 1160 may determine whether power has been applied in an out-of-box state. The out-of-box state may indicate one of a state in which the first external device 1100 is used for the first time or a state in which the first external device 1100 is used for the first time after the first external device 1100 is reset to a factory reset state. For example, the activated setup module 1164 or the processor 1160 may determine whether power has been applied in the out-of-box state, according to work log information of the first external device 1100, which is stored in the memory 1110. For another example, the activated setup module 1164 or the processor 1160 may determine whether power has been applied in the out-of-box state, according to whether information on a user account associated with or designated to the first external device 1100 is stored in the memory 1110.

In an embodiment, the activated setup module 1164 or the processor 1160 may determine whether power has been applied in a state where a network connection state is abnormal. For example, the activated setup module 1164 or the processor 1160 may determine whether power has been applied in a state where the first external device 1100 cannot be connected to the second network 950 due to a physical error of a device (e.g., the electronic device 1000) establishing a network path, a change in the SSID of the second network 950, or the like.

In an embodiment, the activated setup module 1164 may perform one or more operations for performing network setup of the first external device 1100 in a case of the out-of-box state or in a case where power has been applied in an abnormal network connection state. For example, the activated setup module 1164 may acquire SSID information related to the electronic device 1000, which is stored in the memory 1110, and may determine whether a network (e.g., the first network 940) of the acquired SSID exists in an adjacent range of the first external device 1100. The activated setup module 1164 may control the communication module 1120 to broadcast a signal for searching for the first network 940 of the acquired SSID. For another example, if a signal indicating that the network of the acquired SSID has been found is received from the electronic device 1000, the activated setup module 1164 may transmit, to the electronic device 1000, a request signal for connecting to the first network 940.

In an embodiment, the activated setup module 1164 may be deactivated if power is applied in a normal network connection state or in a state that is not an out-of-box state. For example, if information on the user account associated with or designated to the first external device 1100 is stored in the memory 1110, and power is applied in the normal network connection state, the processor 1160 may deactivate the activated setup module 1164.

The output control module 1166 may be a module that controls an output device (speaker 1130 or a display (not illustrated)) to output multimedia data. The output control module 1166 may control an input device and the output device. The output control module 1166 may control activation or deactivation of the output device. The output control module 1166 may control data (e.g., content) to be output to the output device. The output control module 1166 may determine the output device according to a format of data to be output.

Figure 12:
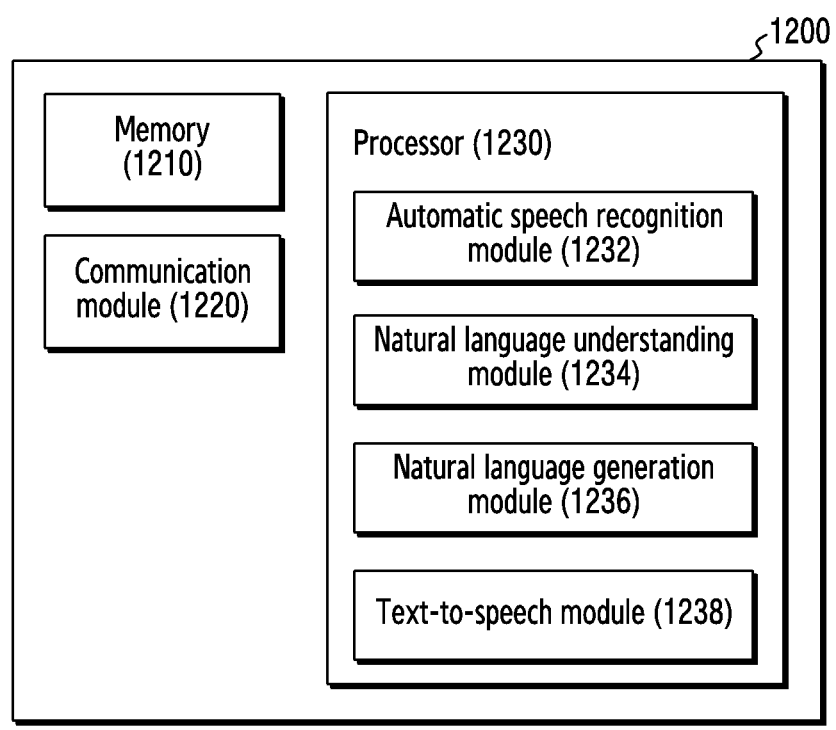
FIG. 12 illustrates a functional configuration of a second external device according to various embodiments of the disclosure.

FIG. 12 illustrates a functional configuration of a second external device 1200 according to various embodiments of the disclosure.

In an embodiment, the second external device 1200 may be the second external device 930 of FIG. 9.

In an embodiment, the second external device 1200 may be a server that exchanges data with a plurality of clients, or a set of servers. For example, the second external device 1200 may be the intelligence server 200 disclosed in FIG. 2.

Referring to FIG. 12, the second external device 1200 may include a memory 1210, a communication module 1220, and a processor 1230.

Under the control of the processor 1230, the memory 1210 may store data which is generated by the second external device 1200 or received from an external device (e.g., the electronic device 1000). The data may be a program for performing a designated function. Data may store information on a user or a device. For example, the memory 1210 may store identification information for an external device (e.g., the electronic device 1000 or the first external device 1100). The memory 1210 may store device information of an external device in association with identification information of the external device.

In an embodiment, the memory 1210 may store account information of a user. For example, the memory 1210 may store account information of a user (e.g., user A) designated to the electronic device 1000. The memory 1210 may store information on another electronic device designated to user A. The memory 1210 may store information indicating that a third external device (e.g., a third external device 1100*b* of FIG. 22) as well as the electronic device 1000 is designated to user A.

In an embodiment, account information of the user (e.g., user A) designated to the electronic device 1000 may include information for determining whether a user of an external device (e.g., the first external device 1100) differing from the electronic device 1000 is a user identical to user A or a user associated with user A. For example, the account information of user A may include an account password of user A or information that is known to only user A (e.g., personal information, such as age, date of birth, etc. of user A, information on an electronic device currently owned by user A, or the like).

In an embodiment, the account information of the user (e.g., user A) designated to the electronic device 1000 may include speech characteristic information of user A. For example, the memory 1210 may include speech characteristic information of user A based on the speech information of user A, which is acquired in advance (e.g., pronunciation, voice tone, frequency, voice thickness, intonation, rhythm, or strength, etc.).

Under the control of the processor 1230, the communication module 1220 may transmit data to an external device (e.g., the electronic device 1000) or may receive data from the external device. For example, the second external device 1200 may receive identification information of the first external device 1100 from the electronic device 1000 via the communication module 1220.

In one embodiment, the communication module 1220 may include a communication circuit.

The processor 1230 may control overall operations of the second external device 1200. For example, the processor 1230 may control the communication module 1220 to receive data from an external device (e.g., the electronic device 1000) or to transmit data to the external device. The processor 1230 may execute a program stored in the memory 1210, and may load, search, or store necessary information.

In an embodiment, the processor 1230 may include an automatic speech recognition module 1232 (e.g., the automatic speech recognition module 210 of FIG. 6), a natural language understanding module 1234 (e.g., a natural language understanding module 220 of FIG. 6), a natural language generation module 1236 (e.g., the natural language generation module 250 of FIG. 6), and a text-to-speech module 1238 (e.g., the text-to-speech module 260 of FIG. 6).

In an embodiment, the processor 1230 may generate data to be transmitted to an external device (e.g., the electronic device 1000). The processor 1230 may generate feedback data corresponding to data received from the external device. The feedback data may be at least one of a control command or a voice message generated by the text-to-speech module 1238. For example, if speech utterance data generated by the first external device 1100 is received from the electronic device 1000, and the received speech utterance data satisfies a predetermined authentication condition, the processor 1230 may generate a control command indicating that the first external device 1100 is to be registered in an access control list of the memory 1010 of the electronic device 1000. For another example, if the received speech utterance data does not satisfy the predetermined authentication condition, the processor 1230 may generate a voice message for requesting additional authentication information. The processor 1230 may determine whether the received speech utterance data satisfies the predetermined authentication condition, by using the automatic speech recognition module 1232 and the natural language understanding module 1234. The processor 1230 may generate a voice message for requesting additional authentication information, by using the natural language generation module 1236 and the text-to-speech module 1238.

An electronic device (e.g., the electronic device 1000 of FIG. 10) according to various embodiments of the disclosure may include: a network interface (the network interface 1040 of FIG. 10); a wireless communication circuit (e.g., the communication module 1020 of FIG. 10) configured to provide at least one wireless network; a processor (e.g., the processor 1030 of FIG. 10) operatively connected to the network interface and to the wireless communication circuit; and a memory (e.g., the memory 1010 of FIG. 10) operatively connected to the processor, wherein the memory is configured to store a selected SSID and at least one piece of user account information, and the memory may store instructions causing, when executed, the processor to: receive the selected SSID from a first external device (e.g., the first external device 1100 of FIG. 11) including a speaker (e.g., the speaker 1130 of FIG. 11) and a microphone (e.g., the microphone 1140 of FIG. 11) via the wireless communication circuit; receive first device information of the first external device from the first external device via the wireless communication circuit; at least temporarily connect the first external device to the wireless network; transmit the first device information and the user account information to an external server (e.g., the second external device 1200) via the network interface; receive first data including information on a setup utterance associated with the user account information from the external server via the network interface; and transmit at least a part of the first data to the first external device via the wireless communication circuit.

According to various embodiments, the electronic device may be an access point device.

According to various embodiments, the setup utterance may include an utterance related to user authentication.

According to various embodiments, the instructions may cause the processor to receive second data associated with a user utterance in response to the setup utterance from the first external device via the wireless communication circuit, and to transmit the second data to the external server via the network interface.

According to various embodiments, the wireless communication circuit may be configured to provide short-range wireless communication on the basis of at least one of Wi-Fi, Bluetooth, ZigBee, and NFC.

According to various embodiments, the instructions may cause the processor to receive, in response to the second data, third data related to user authentication from the external server via the network interface, and to transmit at least a part of the third data to the first external device via the wireless communication circuit.

According to various embodiments, the instructions may cause the processor to register the first external device on the wireless network if the third data is related to completion of the user authentication.

According to various embodiments, the instructions may cause the processor to: if the third data is related to completion of the user authentication, transmit, to the first external device, a signal for activation of at least one module of the first external device, which is related to an input/output function of the first external device; or activate at least one module of the electronic device, which is related to an input/output function of at least one device connected to the electronic device.

According to various embodiments, the instructions may cause the processor to: identify input/output attribute information of the first external device; in order to assist the input/output function of the first external device, determine a second external device differing from the first external device; and transmit at least a part of the first data to the second external device.

An electronic device (e.g., the first external device 1100 of FIG. 11) according to various embodiments of the disclosure may include: a speaker (e.g., the speaker 1130 of FIG. 11); a microphone (e.g., the microphone 1140 of FIG. 11); a wireless communication circuit (e.g., the communication module of FIG. 11) configured to provide wireless communication; a processor (e.g., the processor 1160 of FIG. 11) operatively connected to the speaker, the microphone, and the wireless communication circuit; and a memory (e.g., the memory 1110 of FIG. 11) operatively connected to the processor, wherein the memory is configured to store a selected SSID, and the memory stores instructions causing, when executed, the processor to: transmit the selected SSID to an AP device (e.g., the electronic device 1000 of FIG. 10) via the wireless communication circuit; transmit first device information of the electronic device to the AP device via the wireless communication circuit; receive first data including information on setup utterance related to user account information from the AP device via the wireless communication circuit; on the basis of the first data, generate an utterance by means of the speaker, and receive a user utterance by means of the microphone; and transmit second data associated with the user utterance to the AP device via the wireless communication circuit.

Figure 13:
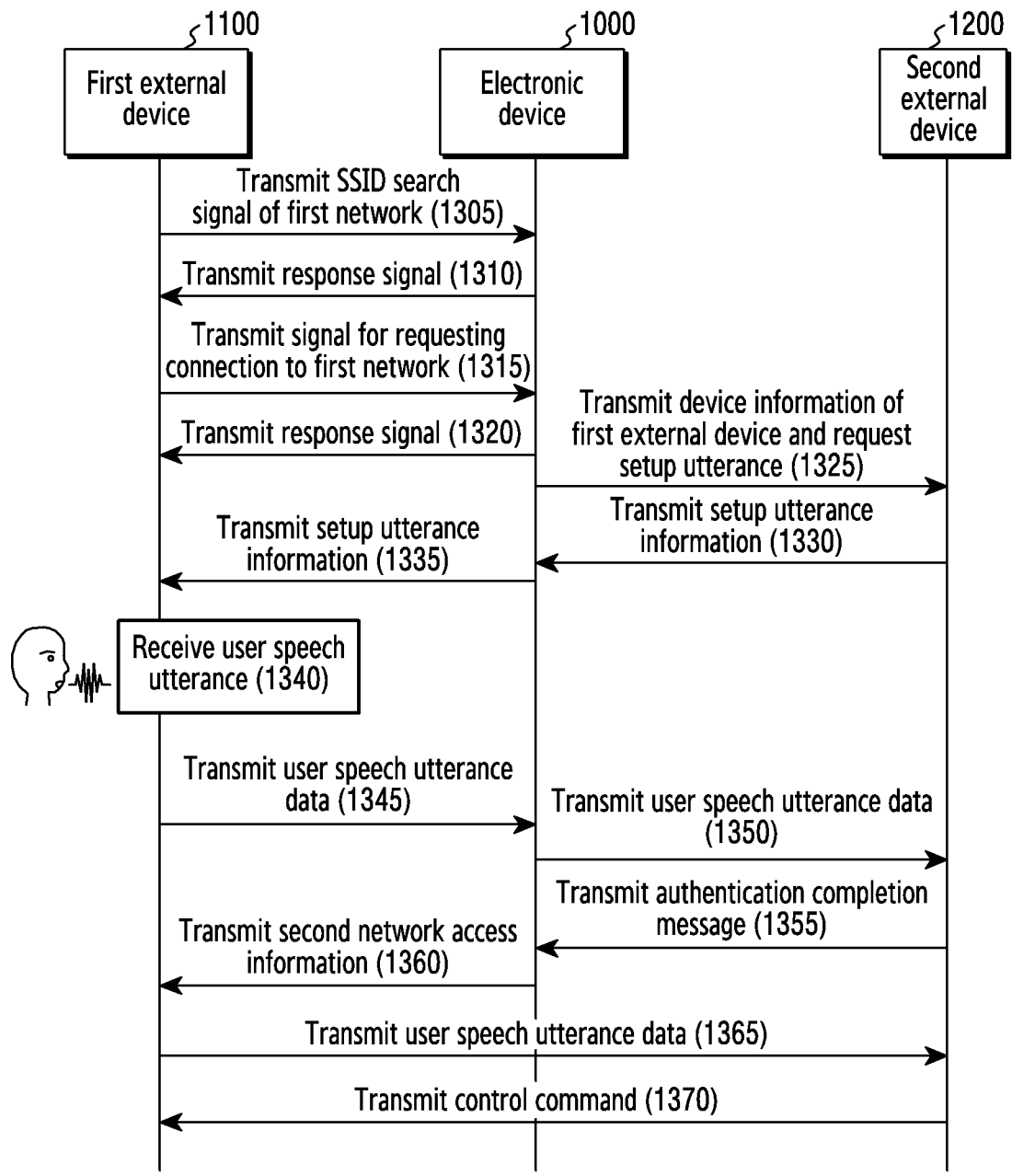
FIG. 13 illustrates signaling between the electronic device, the first external device, and the second external device according to various embodiments of the disclosure.

FIG. 13 illustrates signaling between the electronic device 1000, the first external device 1100, and the second external device 1200 according to various embodiments of the disclosure.

In operation 1305, the first external device 1100 may transmit an SSID search signal of the first network 940.

In an embodiment, the first external device 1100 may acquire SSID information related to the electronic device 1000, which is stored in the memory 1110, and may broadcast a signal for searching for a network (e.g., the first network 940) of the acquired SSID. An SSID search signal of the first network 940 may be a signal for determining whether the first network 940 exists in an adjacent range of the first external device 1100.

In an embodiment, the network search signal of the acquired SSID may include a probe request frame. The probe request frame may be a frame transmitted to each given frequency channel in order to actively search (e.g., 802.11 scan) for a specific AP (or a specific network). In an embodiment, if the network of the acquired SSID is a hidden network, the first external device 1100 may include the acquired SSID information in the probe request frame.

In an embodiment, the network search signal of the acquired SSID may include device information of the first external device 1100. The device information of the first external device 1100 may include at least one of identification information (e.g., a device ID or a serial number, or MAC address information) of the first external device 1100, a manufacturer, a model name, a device name, hardware/software information, performance information (e.g., input/ output attribute information and information on whether a built-in voice message analysis module is provided), or user account information.

In operation 1310, the electronic device 1000 may transmit, to the first external device 1100, a response signal in response to the SSID search signal of the first network 940. The electronic device 1000 may transmit an affirmative response signal.

In an embodiment, the electronic device 1000 may provide the first network 940 before receiving the SSID search signal of the first network 940 from the first external device 1100. In another embodiment, after receiving the SSID search signal of the first network 940 from the first external device 1100, the electronic device 1000 may start (or activate the first network 940) providing of the first network 940. The first network may be a local network, such as a home network.

In an embodiment, the response signal may include a probe response frame. The probe response frame may be a response frame of an AP in response to the probe request frame. In an embodiment, if the first network 940 is a hidden network, the electronic device 1000 may respond to only a search signal including a probe request frame including the SSID information of the first network 940. In another embodiment, if the first network 940 is not a hidden network, the electronic device 1000 may also respond to a search signal including a probe request frame that does not include the SSID information of the first network 940.

In an embodiment, the electronic device 1000 may check the device information of the first external device 1100 included in the SSID search signal, and may transmit an affirmative response signal on the basis of the checked device information.

In operation 1315, the first external device 1100 may transmit, to the electronic device 1000, a signal for requesting connection to the first network 940.

In an embodiment, the signal for requesting connection to the first network 940 may include the device information of the first external device 1100. In another embodiment, if the device information of the first external device 1100 is included in the SSID search signal of the first network 940, the signal for requesting connection to the first network 940 may not include the device information of the first external device 1100.

In an embodiment, the signal for requesting connection to the first network 940 may include an association request frame. The association request frame may be a frame for requesting a network connection to a retrieved AP.

In an embodiment, the association request frame may include capability information of the first external device 1100. The capability information of the first external device 1100 included in the association request frame may be used to determine whether the electronic device 1000 connects the first external device 1100 to the first network 940.

In an embodiment, the association request frame may include information on a radio network interface card (NIC) of the first external device 1100 and the SSID information of the first network 940.

In operation 1320, the electronic device 1000 may transmit a response signal in response to the signal for requesting connection to the first network 940. The electronic device 1000 may transmit an affirmative response signal.

In an embodiment, the electronic device 1000 may determine whether to connect the first external device 1100 to the first network 940, on the basis of the capability information of the first external device 1100, which is included in the signal for requesting connection to the first network 940.

The electronic device 1000 may determine (or negotiate) a resource for the first external device 1100 and the capability of the first external device 1100, which is to be used for communication with the first network 940.

In an embodiment, the response signal of the electronic device 1000 may include an association response frame. The electronic device 1000 may allow the first external device 1100 to connect to the first network 940, by transmitting the response signal including the association response frame.

Via operation 1305 to operation 1320, setup of the first network 940 for the first external device 1100 may be completed. After operation 1305 to operation 1320 are performed, the first external device 1100 may be connected to the first network 940. The first external device 1100 may access the electronic device 1000 via the first network 940.

In operation 1325, the electronic device 1000 may transmit, to the second external device 1200, the device information of the first external device 1100 and a signal for requesting a setup utterance.

In operation 1325, the device information of the first external device 1100, which is transmitted to the second external device 1200, may be information received from the first external device 1100 via at least one of operation 1305 or operation 1315. For example, the device information may be the identification information (e.g., at least one of manufacturer information, a model name, a device name, a serial number such as a manufacturing number, authentication information for network access, or MAC address information) of the first external device 1100.

In an embodiment, the electronic device 1000 may transmit the device information of the electronic device 1000 to the second external device 1200. In another embodiment, the electronic device 1000 may transmit, to the second external device 1200, account information of a user (e.g., user A) designated to the electronic device 1000. In still another embodiment, the electronic device 1000 may transmit, to the second external device 1200, information on a region, in which the electronic device 1000 is installed, and information on a language (e.g., a language selected by the user when the electronic device 1000 is installed) designated to the electronic device 1000.

In an embodiment, the setup utterance may be an utterance related to a user interaction which is to connect the first external device 1100 to the second network 950. The setup utterance may be a voice message. The second external device 1200 may generate the setup utterance by using the natural language generation module 1236 and the text-to-speech module 1238.

In an embodiment, the setup utterance may be related to account information of the electronic device 1000. The account information of the electronic device 1000 may be transmitted to the second external device 1200 in operation 1325, or may be transferred to the second external device 1200 when the electronic device 1000 and the second external device 1200 establish the second network 950.

The setup utterance may include a welcome message and an authentication message. In an embodiment, the welcome message may be a voice message provided to the user for the first time. The welcome message may be a message for, in a state where a user speech utterance has not been received yet, determining a user intent or intention for a network connection, and providing basic information on the network connection, device, and user. For example, the welcome message may be a message, such as "Hello. Device A (e.g., a Wi-Fi speaker) is connected to a power source. Router B of Hong Gil-dong has been detected as a device that can be connected to device A over the network. Are you Gil-dong Hong?" For another example, if the electronic device 1000 includes a plurality of routers, the welcome message may be a message, such as "Hello. Device A (e.g., a Wi-Fi speaker) is connected to a power source. Router B of Gil-dong Hong and router C of Cheol-soo Kim have been detected as devices that can be connected to device A over the network. Which router do you want for connection?"

If the electronic device 1000 is router B, and the user speech utterance (e.g., the user speech utterance received in operation 1340) corresponding to the setup utterance is a speech utterance for selecting router B, the second external device 1200 may transmit an additional setup utterance to the electronic device without changing the router.

If the electronic device 1000 is router B, and the user speech utterance corresponding to the setup utterance is a speech utterance for selecting router C, an additional setup utterance may be transmitted to router C.

In an embodiment, an authentication message may be a voice message for requesting, from the user, authentication information required to connect the first external device 1100 to the second network 950. The authentication message may be generated by the second external device 1200 that has received the user's response message to the welcome message, and may be transmitted to the electronic device 1000.

In an embodiment, the authentication message may be a voice message for requesting information on the first external device 1100. For example, the authentication message may be "Speak device information of device A, please. The device information is indicated on the bottom surface of device A".

In another embodiment, the authentication message may be a voice message for requesting information on a user. For example, the authentication message may be "Which device do you have among Samsung TV, LG TV, and Apple MacBook?" Information of the user may include information on the user's account. For example, the authentication message may be "Speak your account password, please".

In another embodiment, the authentication message may be a speech obtained by changing, into the speech, a sentence capable of most clearly revealing speech feature information of the user. The authentication message may be a voice message requesting the user to read along an arbitrary sentence. The authentication message may be a voice message requesting the user to speak freely, such as "Let me hear your voice now".

In operation 1330, the second external device 1200 may transmit setup utterance information to the electronic device 1000. The second external device 1200 may generate a setup utterance on the basis of at least one of the device information of the first external device 1100, which is received in operation 1325, or second external device information, and may transmit the setup utterance information including the generated setup utterance to the electronic device 1000. For example, if the second external device 1200 receives the identification information of the first external device 1100 in operation 1325, the second external device 1200 may determine whether the received identification information is authenticated identification information. If the received identification information is not authenticated identification information, the second external device 1200 may transmit, to the electronic device 1000, the setup utterance information including a setup utterance of "This device is not verified". For another example, if the identification information of the first external device 1100 is authenticated identification information, and the electronic device 1000 is designated to user A (e.g., Gil-dong Hong), the second external device 1200 may generate a setup utterance, such as "Hello. Device A is connected to a power source. Router of Gil-dong Hong has been detected as a device that can be connected to device A over the network. Are you Gil-dong Hong?". And, the setup utterance information including the generated setup utterance may be transmitted to the electronic device 1000.

In an embodiment, a language of the setup utterance may be determined based on at least one of the device information of the first external device 1100 or the device information of the electronic device 1000. For example, the second external device 1200 may determine the language of the setup utterance on the basis of information on a language for use in the device information of the electronic device 1000. For another example, by using IP information of the electronic device 1000 in the electronic device information of the electronic device 1000, the second external device 1200 may estimate a region in which the electronic device 1000 is used, and may determine the language of the setup utterance on the basis of the estimated region. For another example, the second external device 1200 may estimate a region in which the electronic device 1000 is used, on the basis of location information of a plurality of devices having a history connected to the electronic device 1000, and may determine the language of the setup utterance on the basis of the estimated region.

In an embodiment, the electronic device 1000 may analyze the setup utterance information received from the second external device 1200. On the basis of a result of analyzing the setup utterance information, the electronic device 1000 may eliminate partial information included in the setup utterance information or may add partial information to the setup utterance information. The electronic device 1000 may analyze the setup utterance information by determining whether a data format of the setup utterance information received from the second external device 1200 or a flag designated to the setup utterance information is included. For example, the electronic device 1000 may determine whether a control command for the electronic device 1000 is included in the received setup utterance information, in addition to the voice message. If the received setup utterance information includes a control command for the electronic device 1000, the setup utterance information remaining after excluding the control command for the electronic device 1000 may be transmitted to the first external device 1100.

In another embodiment, the electronic device 1000 may determine whether the setup utterance information received from the second external device 1200 includes only the voice message generated by the second external device 1200.

In operation 1335, the electronic device 1000 may transmit the setup utterance information to the first external device 1100. The electronic device 1000 may transmit the setup utterance information on the basis of at least a part of the setup utterance information received from the second external device 1200 in operation 1330.

In an embodiment, the electronic device 1000 may forward, as it is to the first external device 1100, the setup utterance information received from the second external device 1200 in operation 1330, may eliminate partial information included in the setup utterance information received from the second external device 1200 or add partial information to the received setup utterance information, and then may transmit the setup utterance information to the first external device 1100.

In operation 1340, the first external device 1100 may receive (or recognize) a user speech utterance. The first external device 1100 may output a setup utterance by means of the speaker 1130 on the basis of the setup utterance information received in operation 1335 from the electronic device 1000, and then may receive a user speech utterance. The user speech utterance received in operation 1340 may be a speech utterance corresponding to the output setup utterance. For example, if the output setup utterance is "Which device do you have among Samsung TV, LG TV, and Apple MacBook?", the first external device 1100 may receive a user speech utterance of "I have a Samsung TV".

In operation 1345, the first external device 1100 may transmit data related to the received user speech utterance to the electronic device 1000. In operation 1350, the first external device 1100 may transmit, to the second external device 1200, user speech utterance data received from the first external device 1100.

In an embodiment, the electronic device 1000 may determine whether the received user speech utterance data includes only the voice message generated by the first external device 1100, may correct the user speech utterance data on the basis of a determination result, and may transmit the corrected user speech utterance data to the second external device 1200. In another embodiment, the electronic device 1000 may not determine whether the received user speech utterance data includes only the voice message generated by the first external device 1100, and may forward the user speech utterance data, as it is, to the second external device 1200.

In an embodiment, operation 1325 to operation 1350 may be repeatedly performed until authentication of the first external device 1100 is completed. For example, the second external device 1200 may transmit the setup utterance to the electronic device 1000 multiple times. For example, if an initial setup utterance is a message (e.g., a welcome message) asking whether to proceed with network setup, and the user speech utterance data is an affirmative response thereto, the second external device 1200 may transmit an additional setup utterance (e.g., an authentication message). For another example, if an initial setup utterance is a first authentication message, and the second external device 1200 determines that the authentication is not sufficiently completed with the first authentication message, the second external device 1200 may transmit a second authentication message as an additional setup utterance.

In operation 1355, the second external device 1200 may transmit an authentication completion message to the electronic device 1000.

In an embodiment, the second external device 1200 may determine whether the first external device 1100 is authenticated, on the basis of the received user speech utterance data, and may transmit the authentication completion message to the electronic device 1000 if authentication is successfully completed. Authentication of the first external device 1100 may include determining whether the user of the first external device 1100 is a user identical to (e.g., user A) or associated with (e.g., user B who is family of user A) the user (e.g., user A) designated to the electronic device 1000. For example, if the received user speech utterance data is "I have a Samsung TV", the second external device 1200 may retrieve account information of the user (e.g., user A) designated to the electronic device 1000 from the memory 1210. If the second external device 1200 checks information indicating that user A has Samsung TV, it may be determined that authentication of the first external device 1100 has been successfully completed.

In an embodiment, the second external device 1200 may authenticate the first external device 1100 by using, in addition to the received user speech utterance data, at least a part of the device information of the electronic device 1000 and the device information of the first external device 1100, which has been previously input.

In an embodiment, the authentication completion message may include a voice message. For example, the authentication completion message may include a voice message informing the user that the network setup of device A has been successfully completed, wherein the voice message is "Congratulations. Device A is connected to the Internet." The second external device 1200 may generate a voice message included in the authentication completion message by means of the natural language generation module 1236 and the text-to-speech module 1238.

In an embodiment, the authentication completion message may include a control command for the electronic device 1000. For example, the authentication completion message may include a control command indicating the electronic device 1000 to register the identification information of the first external device 1100 in an access control list of the electronic device 1000.

In operation 1360, the electronic device 1000 may transmit second network access information to the first external device 1100.

In an embodiment, the second network access information may include at least one of an SSID of the second network 950, encryption information for the second network 950, security information, protocol information, IP information assigned to the first external device 1100, information on an authentication scheme to be used for connection to the second network 950, or authentication completion information (e.g., a time at which authentication is completed, user account information that is the basis of authentication, etc.).

In an embodiment, the second network access information may include information on a device (e.g., the second external device 1200) that the first external device 1100 is to access via the second network 950. For example, the second network access information may include information on the second external device 1200 that the first external device 1100 needs to access in order to provide a speech-based service to the user (account or credential information enabling access to the second external device 1200).

In an embodiment, the account or credential information enabling access to the second external device 1200 may be a pair key form or a password form. The account information enabling access to the second external device 1200 may be account information of the user designated to the electronic device 1000. The account or credential information enabling access to the second external device 1200 may be generated including unique identification information of the first external device 1100. The account or credential information enabling access to the second external device 1200 may be related to access priority of the second network 950. For example, first priority credential information may be given to the first external device 1100, in which case the first external device 1100 may have a highest priority for traffic. For another example, lower priority credential information may be given to the first external device 1100, in which case the first external device 1100 has a relatively low priority for traffic, or uses only an external network with a limited protocol.

In an embodiment, the second network access information may include a control command indicating to activate the voice message analysis module 1162 of the first external device 1100. The first external device 1100 may activate the voice message analysis module 1162 of the first external device 1100 on the basis of the control command. Further, the second network access information may not include a control command. In this case, the memory 1110 may store an instruction causing activation of the voice message analysis module 1162 in a case of accessing a network (e.g., the second network 950) other than the first network 940.

The first external device 1100 may be connected to the second network 950 by using the received second network access information. The first external device 1100 may access the second external device 1200 via the second network 950.

Via the described plurality of operations, the network setup for the first external device 1100 may be completed.

After the network setup for the first external device 1100 is completed, the first external device 1100 may provide, in operation 1365 and operation 1370, the user with the speech-based service without control of the electronic device 1000. In an embodiment, the first external device 1100 may provide the user with the speech-based service without control of the electronic device 1000, by means of the activated voice message analysis module 1162.

In an embodiment, the first external device 1100, which has received or recognized the user speech utterance, may transmit speech utterance data including the user speech utterance to the second external device 1200 in operation 1365. For example, the first external device 1100 may transmit, to the second external device 1200, user speech utterance data, such as "Turn down the volume". In operation 1370, the second external device 1200 may transmit, to the first external device 1100, a control command or voice message corresponding to the speech utterance data received from the first external device 1100. For example, the second external device 1200 may transmit, to the first external device 1100, a control command indicating to adjust an output volume of the first external device 1100. The second external device 1200 may transmit, to the first external device 1100, a voice message for providing the user with information relating to a control command to be performed. For example, the second external device 1200 may transmit a voice message of "I'm going to lower the volume by two" to the first external device 1100.

In operation 1365 and operation 1370, the electronic device 1000 may perform only a native function of a router, which is to configure a network path of data exchanged between the first external device 1100 and the second external device 1200. The electronic device 1000 may not perform an operation of generating data to be transmitted to the first external device 1100 or the second external device 1200, analyzing data received from the first external device 1100 or the second external device 1200, or determining data to be transmitted, on the basis of an analysis result.

In an embodiment, the first external device 1100, in which network setup is completed, may be directly connected to the second network 950 without going through the first network 940.

In an embodiment, the first external device 1100, in which network setup is completed, may directly exchange data with the second external device 1200. The meaning that the first external device 1100 directly exchanges data with the second external device 1200 is that data transmitted from the first external device 1100 is transmitted to the second external device 1200 without being controlled by the electronic device 1000, and data transmitted from the second external device 1200 is transmitted to the first external device 1100 without being controlled by the electronic device 1000.

Figure 14:
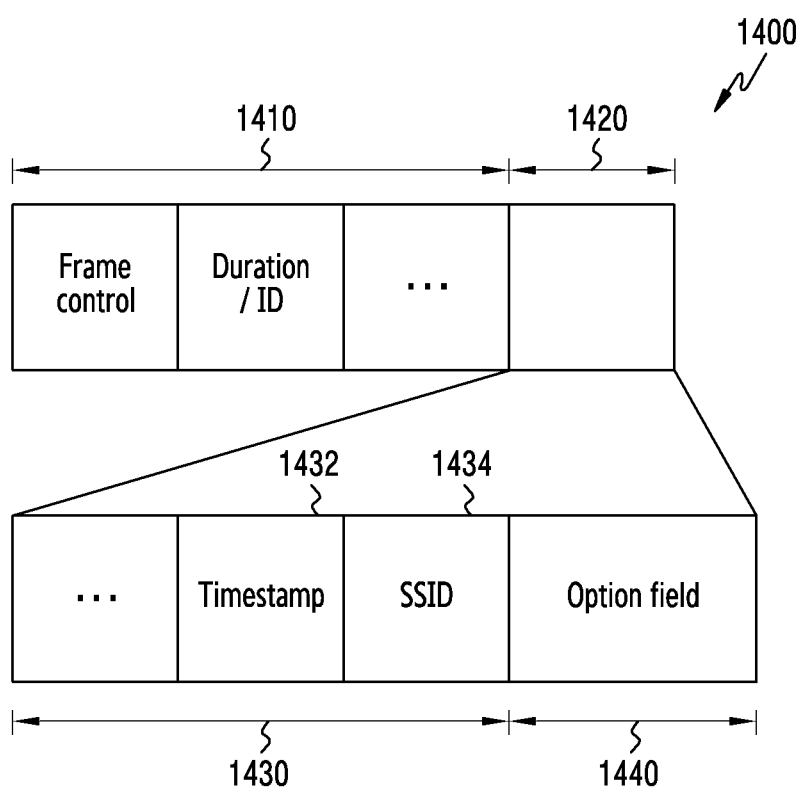
FIG. 14 is a diagram illustrating a probe request frame according to various embodiments of the disclosure.

FIG. 14 is a diagram illustrating a probe request frame 1400 according to various embodiments of the disclosure.

In an embodiment, a probe request frame 1400 may be a frame transmitted to each given frequency channel in order to actively search for a specific AP (or a specific network).

In an embodiment, the probe request frame 1400 may include a frame header 1410 and a frame body 1420. The frame header 1410 may be an 802.11 MAC header. The frame header 1410 may include a frame control field including frame-related control information (e.g., a frame type), and a plurality of fields including a duration/ID field including information of time for wireless nodes to standby.

The frame body 1420 may include a mandatory field 1430 required to be included in the frame body 1420 and an optional field 1440 that is optionally included. The mandatory field 1430 may include a timestamp field 1432 for synchronization between stations, and an SSID field 1434 indicating identification information of a specific network. The option field 1440 may include device information of the first external device 1100. The device information of the first external device 1100 may include at least one of identification information (e.g., a device ID or a serial number, and MAC address information) of the first external device 1100, a manufacturer, a model name, a device name, hardware/software information, input/output attribute information, or user account information. The first external device 1100 may broadcast the probe request frame 1400 including the device information of the first external device 1100 in the option field.

FIG. 14 illustrates only the probe request frame 1400 including the device information of the first external device 1100, but a case, in which an association request frame includes the device information of the first external device 1100, is also possible.

Figure 15:
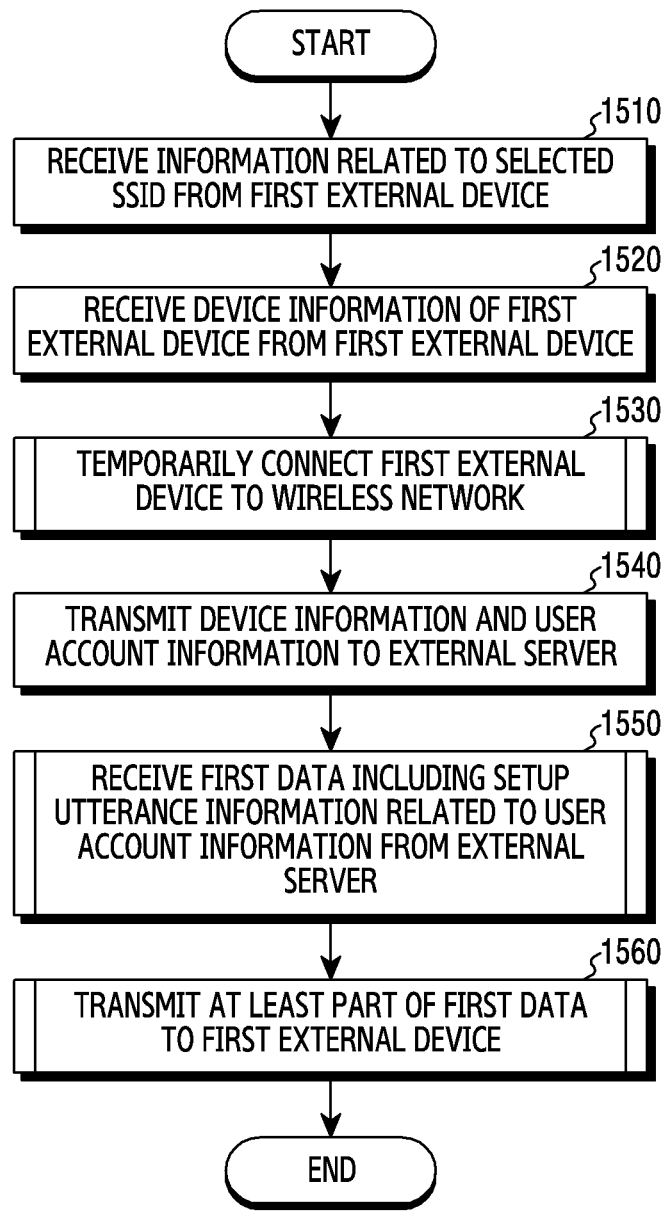
FIG. 15 is a flowchart illustrating an operation sequence of an electronic device according to various embodiments of the disclosure.

FIG. 15 is a flowchart illustrating an operation sequence of an electronic device according to various embodiments of the disclosure.

An electronic device that is a main subject of operations in FIG. 15 may be, for example, the electronic device 1000 of FIG. 10.

In operation 1510, the electronic device 1000 may receive information related to a selected SSID via a communication module (e.g., the communication module 1020 of FIG. 10) from a first external device. The first external device may be the first external device 1100.

In an embodiment, the information related to the selected SSID may include an association request frame or the probe request frame 1400 including selected SSID information.

In an embodiment, the information related to the selected SSID may include the SSID information of the first network 940. The first network 940 may be a hidden network. If the first network 940 is a hidden network, the first external device 1100 may broadcast the probe request frame 1400 including the SSID information of the first network 940. The electronic device 1000 may receive the probe request frame 1400 including the SSID information of the first network 940.

In an embodiment, the electronic device 1000 may be broadcasting the SSID of the first network 940 before receiving information related to the selected SSID from the first external device 1100. The electronic device 1000 may always be broadcasting the SSID of the first network 940, or may temporarily be broadcasting the SSID of the first network 940. For example, the electronic device 1000 may broadcast the SSID of the first network 940 via a trigger operation of, such as a WPS button provided in the electronic device 1000.

In operation 1520, the electronic device 1000 may receive device information of the first external device 1100 from the first external device 1100. For example, the electronic device 1000 may receive, via a communication module (e.g., the communication module 1020 of FIG. 10), a network search signal including the device information of the first external device 1100, or a connection request signal including the device information of the first external device 1100, so as to receive the device information of the first external device 1100.

In an embodiment, operation 1520 and operation 1510 may be concurrently performed. For example, the electronic device 1000 may receive information related to the selected SSID and the device information of the first external device 1100.

In operation 1530, the electronic device 1000 may temporarily connect the first external device 1100 to a wireless network. The wireless network may be the first network 940. For example, the first network 940 may be a local network, such as a home network, and the second network 950 may be an external network. The electronic device 1000 may temporarily connect the first external device 1100 to the first network 940 in order to connect the first external device 1100 to the second network 950.

In operation 1540, the electronic device 1000 may transmit device information and user account information to an external server via a network interface (e.g., the network interface 1040 of FIG. 10). For example, the external server may be the second external device 1200.

In an embodiment, the electronic device 1000 may transmit the device information of the first external device 1100, which is received in operation 1520, to the external server 1200. The electronic device 1000 may transmit account information of a user (e.g., user A) designated to the electronic device 1000, which is stored in the memory 1010, and the device information of the first external device 1100 to the external server 1200.

In operation 1550, the electronic device 1000 may receive first data including setup utterance information related to the user account information from the external server 1200 via the network interface (e.g., the network interface 1040 of FIG. 10).

In an embodiment, the user account information may be user account information transmitted by the electronic device 1000 in operation 1540, or may be at least one piece of user account information among multiple pieces of user account information stored in the external server 1200.

In an embodiment, a setup utterance related to the user account information may be an utterance related to a user interaction for connecting the first external device 1100 to the second network 950. For example, the setup utterance may be an authentication message in the form of speech, such as "Please, speak your account password".

In an embodiment, the setup utterance related to the user account information may be associated with a user context. For example, if the electronic device has transmitted, in operation 1540, account information of user A designated to the electronic device 1000, and the account information of user A includes information that a device owned by user A is Samsung TV, the setup utterance may be an authentication message in the form of speech, such as "Which device do you have among Samsung TV, LG TV, and Apple MacBook?"

In an embodiment, the setup utterance related to the user account information may be related to a method for recognizing a user's voiceprint. The setup utterance may be obtained by changing, into a speech, a sentence which can most clearly shows voice characteristic information of user A, wherein the sentence is stored in the memory 1210 of the external server 1200. For example, if a speech characteristic of user A, which is distinguished from others, is intonation, the setup utterance may be a sentence in which an intonation characteristic is most clearly shown. For another example, the setup utterance may be obtained by changing, into a speech, a sentence irrelevant to the speech characteristic information of user A, such as "Let me hear your voice, now".

In operation 1560, the electronic device 1000 may transmit at least a part of the first data to the first external device 1100. The electronic device 1000 may transmit at least a part of the first data to the first external device 1100 so that the setup utterance information is output by the first external device 1100.

In an embodiment, the electronic device 1000 may determine whether the first data includes only the setup utterance information generated by the external server 1200 or further includes control command information for the electronic device 1000.

For example, if the first data includes only the setup utterance information generated by the external server 1200, the electronic device 1000 may transmit the first data to the first external device 1100.

For another example, if the first data includes control command information for the electronic device 1000, the electronic device 1000 may transmit, to the first external device 1100, the first data excluding the control command information for the electronic device 1000. In an embodiment, if the first data includes the control command information for the electronic device 1000, the electronic device 1000 may perform one or more operations on the basis of a control command for the electronic device 1000. For example, if the first data is a control command indicating to register the first external device 1100 in an access control list of the electronic device 1000, the electronic device 1000 may register the first external device 1100 in the access control list of the electronic device 1000 on the basis of the control command.

Figure 16:
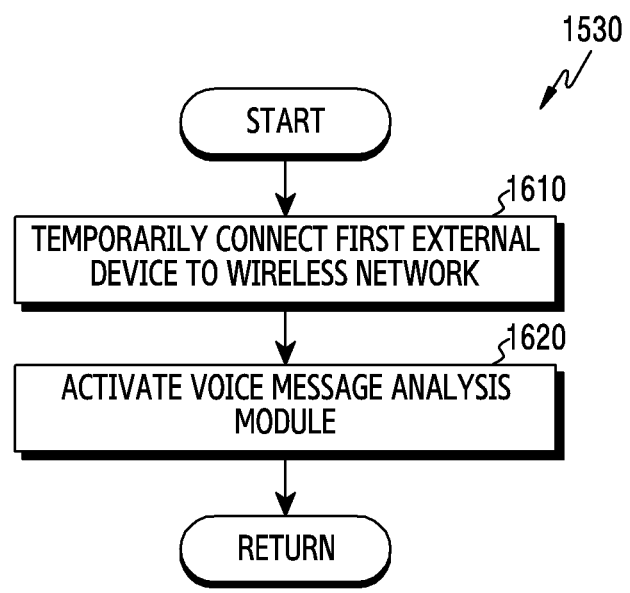
FIG. 16 is a detailed flowchart of an operation for temporarily connecting a first external device to a wireless network by the electronic device according to various embodiments of the disclosure.

FIG. 16 is a detailed flowchart of an operation (e.g., operation 1530 of FIG. 15) for temporarily connecting a first external device to a wireless network by the electronic device according to various embodiments of the disclosure.

In operation 1610, the electronic device 1000 may temporarily connect the first external device 1100 to a wireless network. For example, the electronic device 1000 may temporarily connect the first external device 1100 to the first network 940.

In operation 1620, the electronic device 1000 may activate the voice message analysis module 1032. The electronic device 1000 may establish a channel, via which a voice message can be exchanged with the second external device 1200, by means of the activated voice message analysis module 1032. In an embodiment, the electronic device 1000 may relay at least a part of a message (or data) received from the external device 1200 to the first external device 1100 by means of the activated voice message analysis module 1032. For example, the electronic device 1000 may control the communication module 1020 to transmit, to the first external device 1100, only a voice message among messages (or data) received from the second external device 1200, by means of the activated voice message analysis module 1032.

Figure 17:
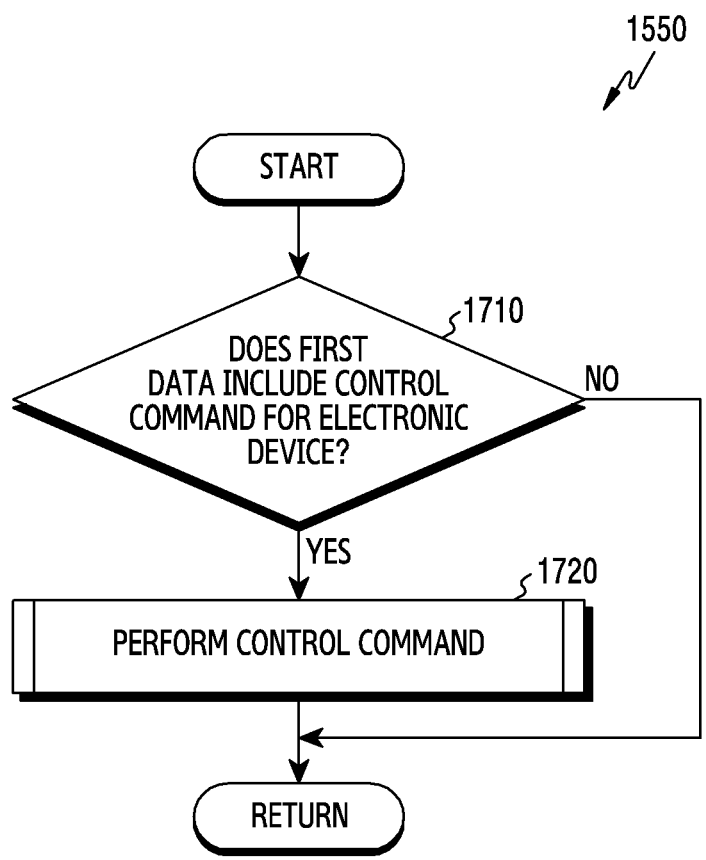
FIG. 17 is a detailed flowchart of an operation for receiving first data including setup utterance information related to user account information from a second external device by the electronic device according to various embodiments of the disclosure.

FIG. 17 is a detailed flowchart of an operation (e.g., operation 1550 of FIG. 15) for receiving first data including setup utterance information related to user account information from a second external device by an electronic device according to various embodiments of the disclosure.

In operation 1710, the electronic device 1000 may determine whether the first data includes a control command for the electronic device 1000. The electronic device 1000 or the voice message analysis module 1032 of the electronic device 1000 may determine whether the first data includes a control command for the electronic device 1000, on the basis of at least one of a flag included in the first data and a compression format of at least a part of data constituting the first data.

If the first data does not include a control command for the electronic device 1000, the electronic device 1000 may perform operation 1560. According to an embodiment, the electronic device 1000 may transmit at least a part of the first data to the first external device 1100.

If the first data includes a control command for the electronic device 1000, the electronic device 1000 may perform the control command in operation 1720.

Figure 18:
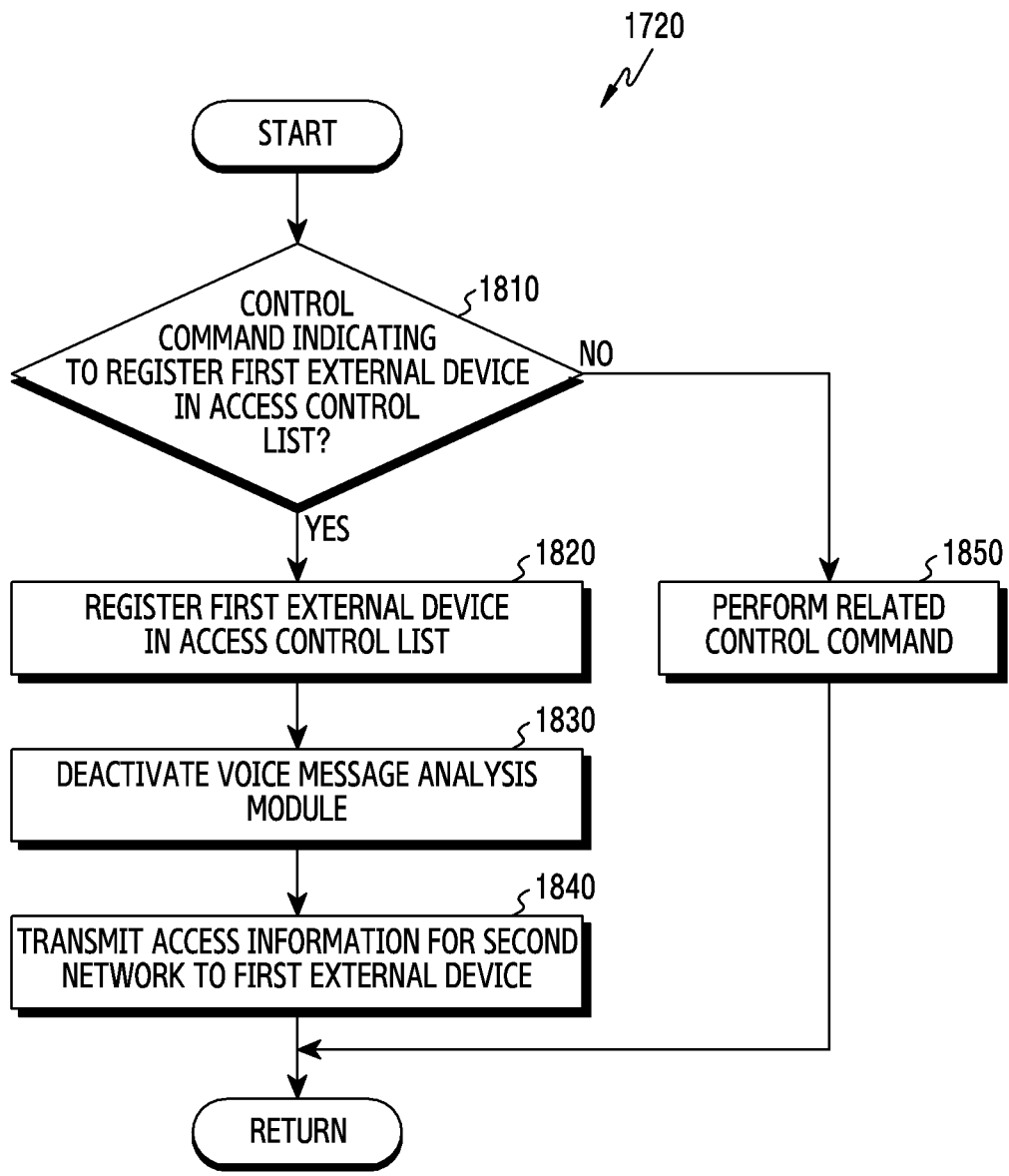
FIG. 18 is a detailed flowchart of an operation for performing a control command by the electronic device according to various embodiments of the disclosure.

FIG. 18 is a detailed flowchart of an operation (e.g., operation 1720 of FIG. 17) for performing a control command by an electronic device according to various embodiments of the disclosure.

In operation 1810, the electronic device 1000 may determine whether a control command included in first data is a control command indicating to register the first external device 1100 in an access control list of the electronic device 1000.

If the control command included in the first data is not a control command indicating to register the first external device 1100 in the access control list of the electronic device 1000, the electronic device 1000 may perform operation 1850. If the control command included in the first data is not a control command indicating to register the first external device 1100 in the access control list of the electronic device 1000, the electronic device 1000 may perform a related control command.

If the control command included in the first data is a control command indicating to register the first external device 1100 in the access control list of the electronic device 1000, the electronic device 1000 may register the first external device 1100 in the access control list of the electronic device 1000 in operation 1820. The access control list of the electronic device 1000 may be a list of devices allowed to be connected to the second network 950. For example, the electronic device 1000 may register identification information (e.g., MAC address) of the first external device 1100 in the access control list of the electronic device 1000.

In operation 1830, the electronic device 1000 may deactivate the voice message analysis module of the electronic device 1000. For example, after allowing the first external device 1100 to connect to the second network 950, the electronic device 1000 performs only a native function of a router, which is to configure a path of a data packet, so that the voice message analysis module 1032 of the electronic device 1000 may be deactivated. Although not illustrated, the electronic device 1000 may deactivate the setup module 1034.

In operation 1840, the electronic device 1000 may transmit access information for the second network 950 to the first external device 1100.

In an embodiment, second network access information may include information on a device (e.g., the second external device 1200) that the first external device 1100 is to access via the second network 950. For example, the second network access information may include information on the second external device 1200 that the first external device 1100 needs to access in order to provide a speech-based service to a user (account or credential information enabling access to the second external device 1200).

In an embodiment, the electronic device 1000 may transmit, to the first external device 1100, a control command for activating the voice message analysis module 1162 of the first external device 1100. On the basis of at least a part of the first data, the electronic device may generate the control command for activation of the voice message analysis module 1162 and may transmit the generated control command to the first external device 1100.

In an embodiment, the electronic device 1000 may transmit, to the first external device 1100, the access information for the second network 950 and a signal indicating that authentication or network setup has been successfully completed.

In an embodiment, the electronic device 1000 may transmit, to the first external device 1100, the access information for the second network 950 and a voice message indicating that authentication or network setup has been successfully completed. For example, if the first data includes the voice message indicating that authentication or network setup has been successfully completed, the voice message may be transmitted to the first external device 1100.

Figure 19:
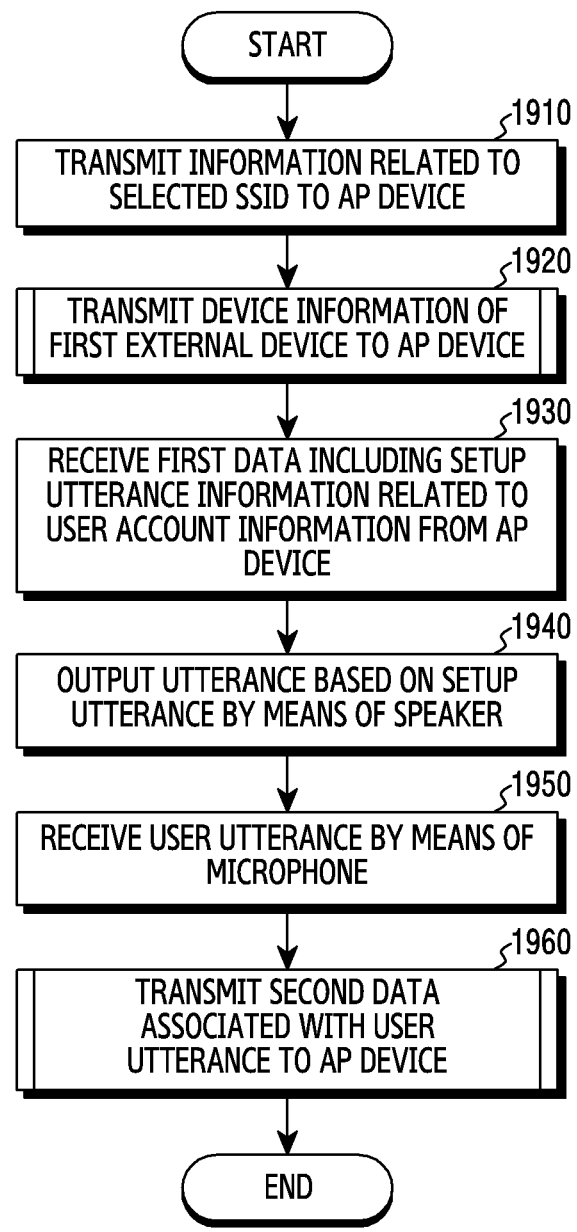
FIG. 19 is a flowchart illustrating an operation sequence of a first external device according to various embodiments of the disclosure.

FIG. 19 is a flowchart illustrating an operation sequence of a first external device according to various embodiments of the disclosure.

A first external device that is a main subject of operations in FIG. 19 may be, for example, the first external device 1100 of FIG. 11.

In operation 1910, the first external device 1100 may transmit information related to a selected SSID to an AP device.

In an embodiment, the AP device is a wireless device that serves as a base station in a wireless LAN environment, and may be, for example, the electronic device 1000 of FIG. 10.

In an embodiment, the first external device 1100 may perform operation 1910 in an out-of-box state.

In an embodiment, the first external device 1100 may transmit information related to one SSID selected from among a plurality of SSIDs stored in the memory 1110. The first external device 1100 may sequentially transmit information related to one SSID among the plurality of SSIDs stored in the memory 1110. The plurality of SSIDs stored in the memory 1110 may be SSIDs predesignated so as to be accessed (or searched) for network setup when the first external device 1100 is recognized to be in the out-of-box state. For example, the first external device 1100 may broadcast the probe request frame 1400 including selected SSID information.

In operation 1920, the first external device 1100 may transmit device information of the first external device 1100 to the AP device 1000. For example, the first external device 1100 may broadcast the probe request frame 1400 including identification information of the first external device 1100 to the option field 1440.

In operation 1930, the first external device 1100 may receive first data including setup utterance information related to user account information from the AP device 1000.

In an embodiment, the user account information may be account information of a user (e.g., user A) designated to the AP device 1000. The account information of the user designated to the AP device 1000 may include information for determining whether a user of a particular external device (e.g., the first external device 1100) is identical to user A or associated with user A. For example, the user account information may include an account password of user A or information known only to user A (e.g., age, date of birth, etc. of user A).

In an embodiment, a setup utterance may be an utterance related to a user interaction for connecting the first external device 1100 to the second network 950. The setup utterance may be a voice message generated by the second external device 1200. For example, the setup utterance may include a welcome message and an authentication message.

In an embodiment, the first external device 1100 may activate the speaker 1130 and/or the microphone 1140 in response to reception of the first data.

In operation 1940, the first external device 1100 may output an utterance based on the setup utterance by means of the speaker 1130. The first external device 1100 may output the setup utterance by means of the activated speaker 1130. For example, the output control module 1166 of the first external device 1100 may determine that the setup utterance included in the first data is a voice message, and may control the speaker 1130 to output the setup utterance. For example, under the control of the output control module 1166, the speaker 1130 may output an authentication message, such as "Which device do you have among Samsung TV, LG TV, and Apple MacBook?"

In operation 1950, the first external device 1100 may receive a user utterance by means of the microphone 1140. The first external device 1100 may recognize a user utterance, such as "I have a Samsung TV", by means of the activated microphone 1140. For example, the output control module 1166 may control the microphone 1140 to recognize the user utterance.

In operation 1960, the first external device 1100 may transmit second data associated with the user utterance to the AP device 1000. For example, the output control module 1166 may convert a recognized user utterance signal into an electrical signal (or from an analog signal to a digital signal), and may control the communication module 1120 to enable transmission of the converted signal to the AP device 1000.

Figure 20:
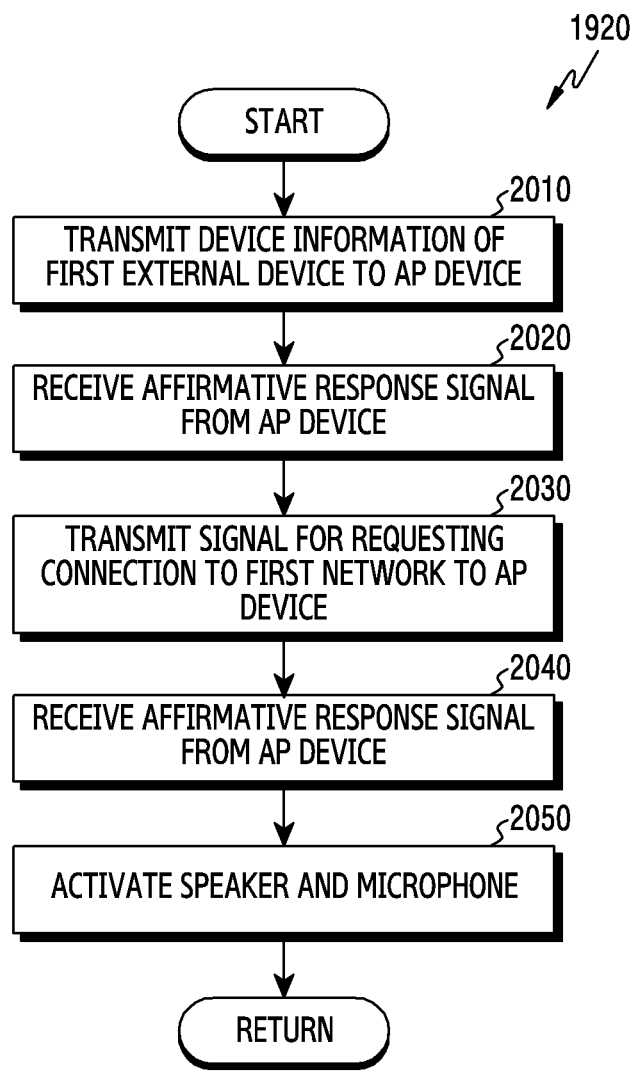
FIG. 20 is a detailed flowchart of an operation for transmitting device information of the first external device to an AP device by the first external device according to various embodiments of the disclosure.

FIG. 20 is a detailed flowchart of an operation (e.g., operation 1920 of FIG. 19) for transmitting device information of the first external device to an AP device by the first external device according to various embodiments of the disclosure.

In operation 2010, the first external device 1100 may transmit device information of the first external device 1100 to the AP device 1000. For example, the first external device 1100 may transmit an SSID search signal including identification information (e.g., MAC address) of the first external device 1100 to the AP device 1000.

In operation 2020, the first external device 1100 may receive an affirmative response signal in response to the SSID search signal from the AP device 1000 in operation 2010.

In operation 2030, the first external device 1100 may transmit a first network connection request signal to the AP device 1000. For example, in response to the affirmative response signal received from the AP device 1000, the first external device 1100 may transmit the first network connection request signal to the AP device 1000 in operation 2030.

In operation 2040, the first external device 1100 may receive the affirmative response signal from the AP device 1000. For example, the first external device 1100 may receive an association response frame from the AP device 1000.

In operation 2050, the first external device 1100 may activate the speaker 1130 and/or the microphone 1140.

In an embodiment, on the basis of instructions stored in the memory 1110, the first external device 1100 may activate the speaker 1130 and/or the microphone 1140 in response to reception of the association response frame from the AP device 1000.

In another embodiment, the first external device 1100 may activate the speaker 1130 and/or the microphone 1140 on the basis of a control command included in the affirmative response signal (or the association response frame) received in operation 2040. The first external device 1100 may activate the speaker 1130 and/or the microphone 1140 on the basis of a control command received after the affirmative response signal (or the association response frame) received in operation 2040.

In an embodiment, the first external device 1100 may activate the speaker 1130 and/or the microphone 1140, and if the voice message analysis module 1162 has been activated, the first external device 1100 may deactivate the voice message analysis module 1162.

In an embodiment, in order to allow a voice interaction for network setup to be performed in a limited network environment, the first external device 1100 may activate the speaker 1130 and/or the microphone 1140.

Figure 21:
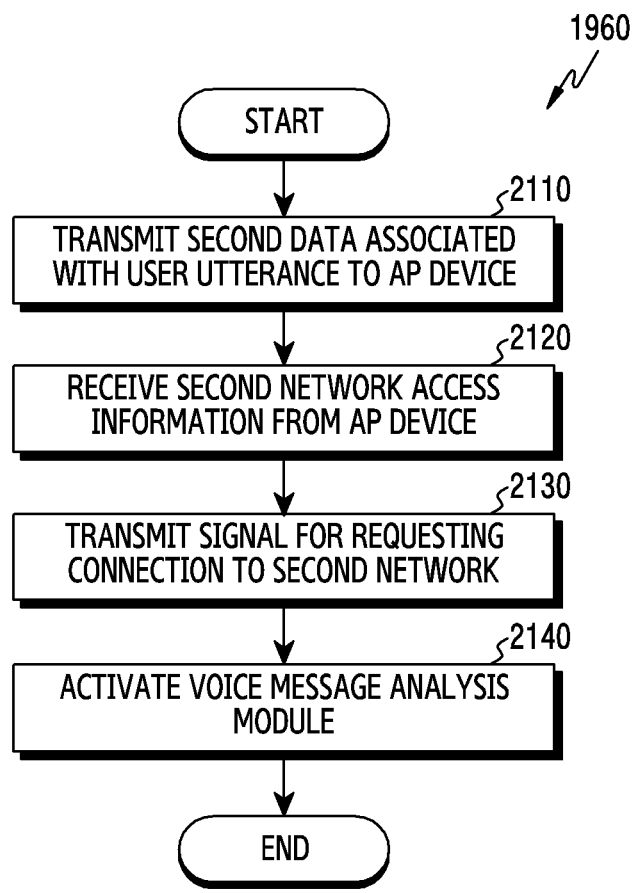
FIG. 21 is a detailed flowchart of an operation for transmitting second data associated with a user utterance to the AP device by the first external device according to various embodiments of the disclosure.

FIG. 21 is a detailed flowchart of an operation for transmitting second data associated with a user utterance to an AP device by a first external device according to various embodiments of the disclosure.

In operation 2110, the first external device 1100 may transmit second data associated with a user utterance to the AP device 1000. For example, if the user utterance is "I have a Samsung TV", the first external device 1100 may convert a user utterance signal to an electrical signal, and may transmit the converted signal to the AP device 1000.

In operation 2120, the first external device 1100 may receive second network access information from the AP device 1000.

In an embodiment, the AP device 1000 may transmit the second data received in operation 2110 to the second external device 1200, and the second external device 1200 may authenticate the first external device 1100 by using at least a part of the second data. After the second external device 1200 authenticates the first external device 1100, the first external device 1100 may receive the second network access information from the AP device 1000.

In an embodiment, the second network access information may include information on the second network 950 or information on a device (e.g., the second external device 1200) that the first external device 1100 is to access via the second network 950.

In operation 2130, the first external device 1100 may transmit, to the AP device 1000, a signal for requesting connection to the second network 950. The first external device 1100 may transmit the signal for requesting connection to the second network 950 to the AP device 1000 by using the second network access information.

In operation 2140, the first external device 1100 may activate the voice message analysis module 1162. Before being connected to the second network 950, under the control of the AP device 1000, the first external device 1100 has passively performed only a function of outputting a voice message generated by the second external device 1200 and/or receiving an input user speech utterance. However, after being connected to the second network 950, the first external device 1100 may directly exchange voice messages with the second external device 1200, thereby providing a general speech-based service to a user without being controlled by the AP device 1000.

Figure 22:
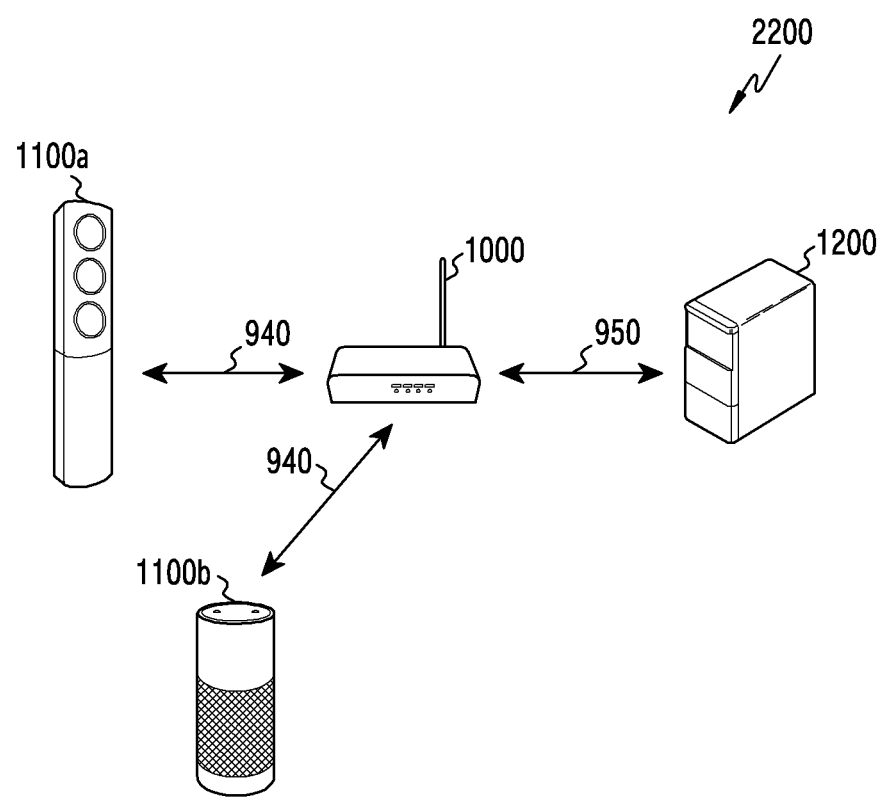
FIG. 22 illustrates a network setup system according to various embodiments of the disclosure.

FIG. 22 illustrates a network setup system according to various embodiments of the disclosure.

Referring to FIG. 22, a network setup system 2200 according to various embodiments of the disclosure may include the electronic device 1000, a first external device 1100a, the second external device 1200, and a third external device 1100b.

The first external device 1100a is similar to the first external device 1100 of FIG. 11, but may be different in some aspects.

In an embodiment, the first external device 1100a may be an IoT device including a sensor function and a communication function, but may be a device that does not include a microphone and a speaker. For example, the first external device 1100a may be an air conditioner device. That is, since the first external device 1100a does not support voice interaction using a microphone and a speaker, voice interaction of the first external device 1100a may not be used for network setup of the first external device 1100a.

The third external device 1100b may be the first external device 1100 of FIG. 11. That is, the third external device 1100b may include a sensor function and a communication function, and may include the microphone 1130 and the speaker 1140. For example, the third external device 1100b may be a Wi-Fi speaker.

In an embodiment, the third external device 1100b may be a device that assists network setup of the first external device 1100a that does not include a microphone and a speaker.

In an embodiment, the third external device 1100b may be a device in a state (or an out-of-box state) in which network setup is not completed. In another embodiment, the third external device 1100b may be connected to the electronic device 1000 via the first network 940. In another embodiment, the third external device 1100b may be in a state where network setup is completed, and the third external device 1100b is connected to the second external device 1200 via the second network 950.

Figure 23:
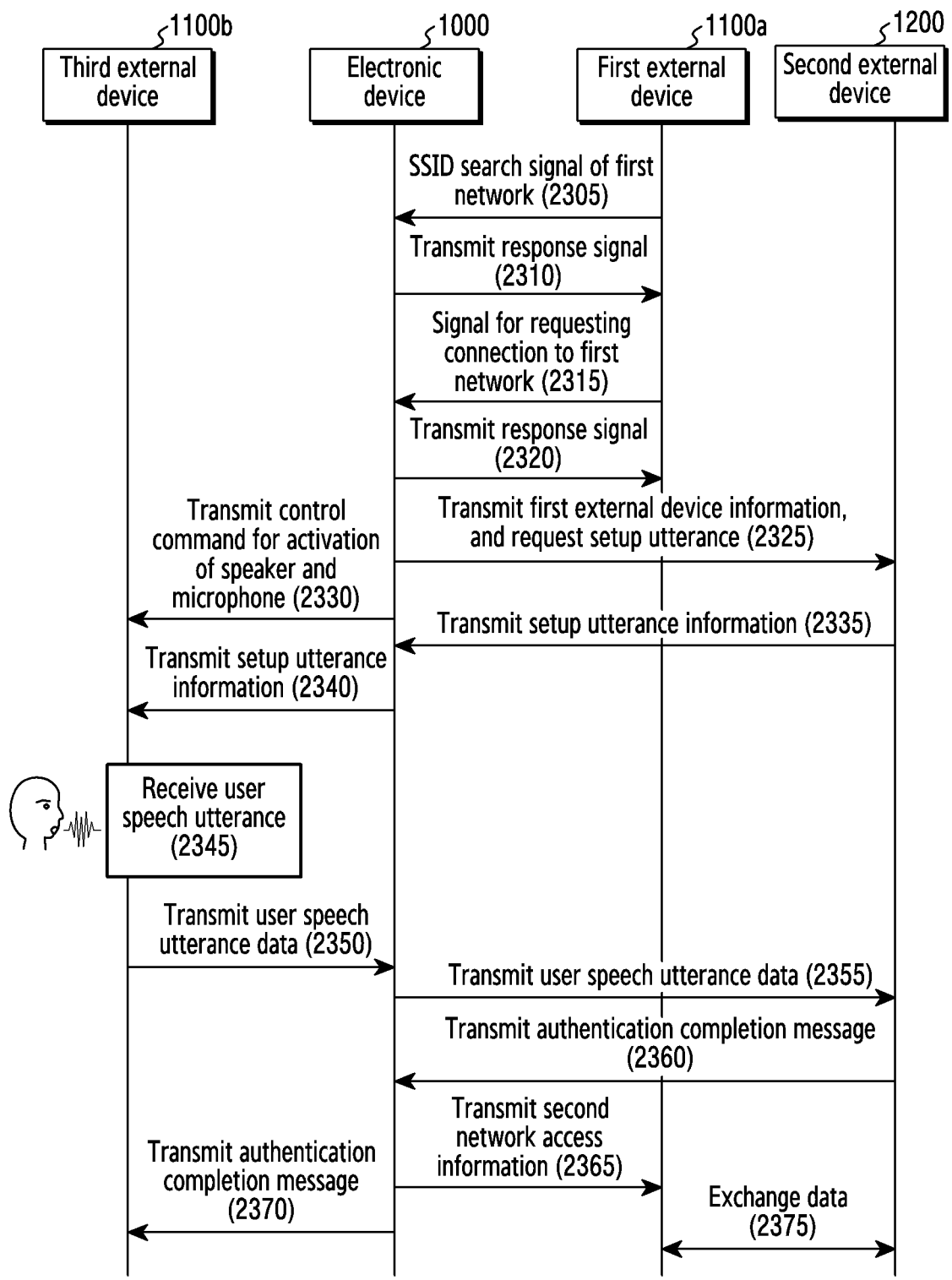
FIG. 23 illustrates signaling between an electronic device, a first external device, a second external device, and a third external device according to various embodiments of the disclosure.

FIG. 23 illustrates signaling between an electronic device, a first external device, a second external device, and a third external device according to various embodiments of the disclosure.

Operations 2305 to 2320 disclosed in FIG. 23 are similar to operations 1305 to 1320 disclosed in FIG. 13, and therefore detailed descriptions thereof will be omitted.

In operation 2325, the electronic device 1000 may transmit, to the second external device 1200, device information of the first external device 1100a and a signal for requesting a setup utterance.

In an embodiment, the device information of the first external device 1100a may include input/output attribute information and identification information of the first external device 1100a. For example, the electronic device 1000 may transmit the identification information of the first external device 1100a and the input/output attribute information indicating that the first external device 1100a does not include a microphone and/or a speaker.

In operation 2330, the electronic device 1000 may transmit a control command indicating the third external device 1100b to activate a speaker and microphone of the third external device 1100b. In an embodiment, the third external device 1100b may be a device that assists network setup of the first external device 1100a that does not include a microphone and a speaker.

The third external device 1100b may be a device which is different from the first external device 1100a and is connected to the electronic device 1000 via the first network 940 or the second network 950. The third external device 1100b may be a device in which network setup is in progress or has been completed.

In an embodiment, the third external device 1100b may be a device predesignated to a user before network setup of the first external device 1100a starts. In another embodiment, the third external device 1100b may be a device selected by the electronic device 1000.

In an embodiment, a control command indicating to activate the speaker and microphone of the third external device 1100b may be transmitted with setup utterance information to the third external device 1100b in operation 2340.

In operation 2335, the electronic device 1000 may receive setup utterance information from the second external device 1200. A setup utterance may be an authentication message for requesting information on a user, such as "Which device do you have among Samsung TV, LG TV, and Apple MacBook?"

In an embodiment, the setup utterance may include a content indicating that the setup utterance is a voice message for network setup of the first external device 1100a. For example, the setup utterance may be "Hello. Network setup of device C (the first external device 1100a) is starting. Which device do you have among Samsung TV, LG TV, and Apple MacBook?"

In operation 2340, the electronic device 1000 may transmit setup utterance information to the third external device 1100b. The electronic device 1000 may eliminate a part of information included in the received setup utterance information or may add a part of information to the received setup utterance information, and then may transmit the setup utterance information to the third external device 1100b. For example, the electronic device 1000 may add, to the received setup utterance information, information indicating the setup utterance information is for the network setup of the first external device 1100a, and then may transmit the setup utterance information to the third external device 1100b. For another example, if a control command for the electronic device 1000 is included in the received setup utterance information, the part of the setup utterance information, which is remaining after excluding a control command part, may be transmitted to the third external device 1100b.

In operation 2345, the third external device 1100b may receive (or recognize) a user speech utterance. The third external device 1100b may output a setup utterance by means of the speaker on the basis of the setup utterance information received in operation 2340 from the electronic device 1000, and then may receive a user speech utterance by means of the microphone.

Operation 2350 and operation 2355 are similar to operation 1345 and operation 1350 of FIG. 13, and therefore detailed descriptions thereof will be omitted.

In operation 2360, the second external device 1200 may transmit an authentication completion message. If authentication of the first external device 1100a is successfully completed on the basis of received user speech utterance data, the second external device 1200 may transmit an authentication completion message to the electronic device 1000.

In an embodiment, the authentication completion message may include a control command for the electronic device 1000 and a voice message, which indicates that the network setup of the first external device 1100a has been successfully completed, such as "Congratulations. Device C (the first external device 1100a) is connected to the Internet". For example, the control command may indicate the electronic device 1000 to register identification information of the first external device 1100a in an access control list of the electronic device 1000.

In operation 2365, the electronic device 1000 may transmit access information of the second network 950 to the first external device 1100a. For example, the electronic device 1000 may include at least one of encryption information for the second network 950, protocol information, IP information assigned to the first external device 1100s, or authentication information.

In an embodiment, the electronic device 1000 may add the identification information of the first external device 1100a to the access control list. Also, the electronic device 1000 may transmit, to the first external device 1100a, a signal for requesting roaming from the first network 940 to the second network 950. For example, the signal for requesting roaming of the second network 950 may include a BSS transition management frame.

In operation 2370, the electronic device 1000 may transmit the authentication completion message to the third external device 1100b. The electronic device 1000 may transmit at least a part of the authentication completion message to the third external device 1100b. The electronic device 1000 may transmit, to the third external device 1100b, a voice message indicating that the network setup has been successfully completed. The electronic device may transmit the voice message to the third external device 1100b so as to output the voice message via the speaker of the third external device 1100b.

In operation 2375, the first external device 1100a may exchange data with the second external device 1200. For example, the first external device 1100a may receive various types of control commands from the second external device 1200 and may execute the received control commands.

Figure 24:
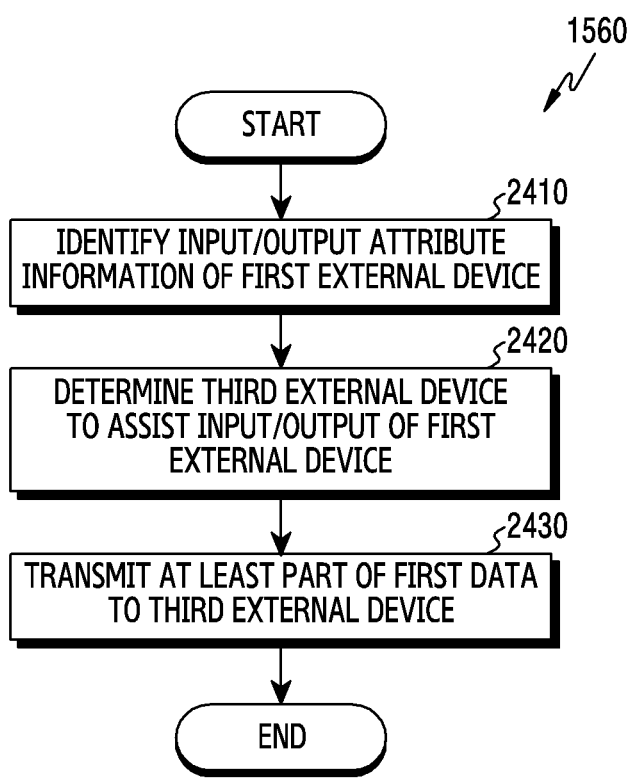
FIG. 24 is a detailed flowchart of an operation for transmitting at least a part of first data to a first external device by an electronic device according to various embodiments of the disclosure.

FIG. 24 is a detailed flowchart of an operation (e.g., operation 1560 of FIG. 15) for transmitting at least a part of first data to a first external device by an electronic device according to various embodiments of the disclosure.

An electronic device that is a main subject of operations in FIG. 24 may be the electronic device 1000 of FIG. 10.

In operation 2410, the electronic device 1000 may identify input/output attribute information of a first external device. Here, the first external device may refer to the first external device 1100a of FIG. 22. Hereinafter, the first external device is described as the first external device 1100a.

In an embodiment, the electronic device 1000 may identify input/output attribute information of the first external device 1100a, which is included in device information of the first external device 1100a, wherein the device information is received in operation 1520. For example, the electronic device 1000 may identify information that the first external device 1100a does not support a voice input function or voice output function.

In operation 2420, the electronic device 1000 may determine a third external device that assists input/output of the first external device 1100a. The electronic device 1000 may determine a third external device to assist voice input/output of the first external device 1100a. The third external device may refer to the third external device 1100b of FIG. 22. Hereinafter, the third external device is described as the third external device 1100b.

In an embodiment, the electronic device 1000 may determine the third external device 1100b by using at least a part of device information of a plurality of devices connected to the electronic device 1000, which is stored in the memory 1010.

In an embodiment, the electronic device 1000 may determine the third external device 1100b supporting a voice input/output function from among the plurality of devices connected to the electronic device 1000.

In another embodiment, if there are multiple devices supporting the voice input/output function, the electronic device 1000 may determine the third external device 1100b closest to the first external device 1100a. For example, if the electronic device 1000 and the plurality of devices connected to the electronic device 1000 establish a mesh network or an ad hoc network, the electronic device 1000 may determine locations of the plurality of devices on the basis of a triangulation method.

In another embodiment, on the basis of the magnitude of voice signals transmitted from the plurality of devices that support the voice input/output function, the electronic device 1000 may determine the third external device 1100b located closest to the first external device 1100a. For example, if devices supporting the voice input/output function are device D and device E, voice signals input from the surroundings within a predetermined time period (e.g., from operation 1510 to operation 1550) may be received from device D and device E, and a device with a greatest magnitude of a received voice signal may be determined to be the third external device 1100b. For another example, if devices supporting the voice input/output function are device D and device E, the electronic device 1000 may cause device D and device E to output an identical voice message ("Let me hear your voice"), voice signals related to a user response utterance may be received from device D and device E, and a device with a greatest magnitude of a received voice signal may be determined to be the third external device 1100b.

In operation 2430, the electronic device 1000 may transmit at least a part of the first data to the third external device 1100b. For example, if the first data includes an authentication message, such as "Hello. Network setup of device C (the first external device 1100a) is starting. Which device do you have among Samsung TV, LG TV, and Apple MacBook?", the electronic device 1000 may transmit the authentication message to the third external device 1100b. The third external device 1100b may output the received at least a part of the first data by means of a speaker.

On the basis of the above-described process, the third external device 1100b may perform a voice interaction function in order to perform network setup of the first external device 1100a.

An operation method of an electronic device (e.g., the electronic device 1000 of FIG. 10) or a processor (e.g., the processor 1030 of the electronic device 1000 of FIG. 10) of the electronic device according to various embodiments of the disclosure may include: receiving a selected SSID from a first external device (e.g., the first external device 1100 of FIG. 11); receiving first device information of the first external device from the first external device; at least temporarily connecting the first external device to the wireless network; transmitting the first device information and pre-stored user account information to an external server (e.g., the second external device 1200 of FIG. 12); receiving first data from the external server, wherein the first data includes information on a setup utterance associated with the user account information; and transmitting at least a part of the first data to the first external device via a wireless communication circuit (e.g., the communication module 1020 of FIG. 10).

According to various embodiments, the electronic device may be an access point device.

According to various embodiments, the setup utterance may include an utterance related to user authentication.

According to various embodiments, the method may further include: receiving second data associated with a user utterance in response to the setup utterance from the first external device via the wireless communication circuit; and transmitting the second data to the external server.

According to various embodiments, the wireless communication circuit may be configured to provide short-range wireless communication on the basis of at least one of Wi-Fi, Bluetooth, ZigBee, and NFC.

According to various embodiments, the method may further include: receiving, in response to the second data, third data related to user authentication from the external server; and transmitting at least a part of the third data to the first external device via the wireless communication circuit.

According to various embodiments, the method may further include registering the first external device on the wireless network if the third data is related to completion of the user authentication.

According to various embodiments, the method may further include: if the third data is related to completion of the user authentication, transmitting, to the first external device, a signal for activation of at least one module of the first external device, which is related to an input/output function of the first external device; or activating at least one module of the electronic device, which is related to an input/output function of at least one device connected to the electronic device.

According to various embodiments, the transmitting of at least a part of the first data to the first external device via the wireless communication circuit may further include: checking input/output attribute information of the first external device; in order to assist the input/output function of the first external device, determining a second external device differing from the first external device; and transmitting at least a part of the first data to the second external device.

An operation method of an electronic device (e.g., the first external device 1100 of FIG. 11) or a processor (e.g., the processor 1160 of the first external device 1100 of FIG. 11) of the electronic device according to various embodiments of the disclosure may include: transmitting a selected SSID to an AP device (e.g., the electronic device 1000 of FIG. 10); transmitting device information of the electronic device to the AP device; receiving first data from the AP device, wherein the first data includes information on a setup utterance related to user account information; receiving a user utterance by means of the microphone on the basis of the first data; and transmitting second data associated with the user utterance to the AP device.

The embodiments disclosed in the specification and drawings merely describe contents of the disclosure and provide specific examples to help understanding, and are not intended to limit the scope of the disclosure. Therefore, the scope of the disclosure should be interpreted to include all modifications or modified forms derived based on the technical spirit of the disclosure, in addition to the embodiments disclosed herein.

The invention claimed is:

1. An electronic device comprising:
a network interface;
a wireless communication circuit configured to provide at least one wireless network;
a processor operatively connected to the network interface and the wireless communication circuit; and
a memory operatively connected to the processor,
wherein the memory is configured to store a selected service set identifier (SSID) and at least one piece of user account information, and
the memory stores instructions causing, when executed, the processor to:
receive the selected SSID from a first external device comprising a speaker and a microphone via the wireless communication circuit;
receive first device information of the first external device from the first external device via the wireless communication circuit;
at least temporarily connect the first external device to the wireless network;
transmit the first device information and the user account information to an external server via the network interface;
receive first data comprising information on a setup utterance associated with the user account information from the external server via the network interface; and
transmit at least a part of the first data to the first external device via the wireless communication circuit.

2. The electronic device of claim 1, wherein the electronic device is an access point device.

3. The electronic device of claim 1, wherein the setup utterance comprises an utterance related to user authentication.

4. The electronic device of claim 1, wherein the instructions cause the processor to:
receive second data associated with a user utterance in response to the setup utterance from the first external device via the wireless communication circuit; and
transmit the second data to the external server via the network interface.

5. The electronic device of claim 1, wherein the wireless communication circuit is configured to provide short range wireless communication on the basis of at least one of Wi-Fi, Bluetooth, ZigBee, and near field communication (NFC).

6. The electronic device of claim 4, wherein the instructions cause the processor to:
receive third data related to user authentication from the external server via the network interface in response to the second data; and
transmit at least a part of the third data to the first external device via the wireless communication circuit.

7. The electronic device of claim 6, wherein the instructions cause the processor to, if the third data is related to user authentication completion, register the first external device on the wireless network.

8. The electronic device of claim 6, wherein the instructions cause the processor to, if the third data is related to user authentication completion, transmit, to the first external device, a signal for activation of at least one module of the first external device, which is related to an input/output function of the first external device, or activate at least one module of the electronic device, which is related to an input/output function of at least one device connected to the electronic device.

9. The electronic device of claim 2, wherein the instructions cause the processor to:
identify input/output attribute information of the first external device;
in order to assist an input/output function of the first external device, determine a second external device differing from the first external device; and
transmit at least a part of the first data to the second external device.

10. An electronic device comprising:
a speaker;
a microphone;
a wireless communication circuit configured to provide wireless communication;
a processor operatively connected to the speaker, the microphone, and the wireless communication circuit; and
a memory operatively connected to the processor,
wherein the memory is configured to store a selected service set identifier (SSID), and
the memory stores instructions causing, when executed, the processor to:
transmit the selected SSID to an access point (AP) device via the wireless communication circuit;
transmit first device information of the electronic device to the AP device via the wireless communication circuit;
receive first data comprising information on a setup utterance related to user account information from the AP device via the wireless communication circuit;
on the basis of the first data, generate an utterance by means of the speaker, and receive a user utterance by means of the microphone; and
transmit second data associated with the user utterance to the AP device via the wireless communication circuit.

11. An operation method of an electronic device comprising a wireless communication circuit configured to provide at least one wireless network, the method comprising:
receiving a selected SSID from a first external device;
receiving first device information of the first external device from the first external device;
at least temporarily connecting the first external device to the wireless network;
transmitting the first device information and pre-stored user account information to an external server;
receiving first data from the external server, wherein the first data comprises information on a setup utterance associated with the user account information; and
transmitting at least a part of the first data to a third external device differing from the first external device via the wireless communication circuit.

12. The operation method of claim 11, wherein the electronic device is an access point device.

13. The operation method of claim 11, wherein the setup utterance comprises an utterance related to user authentication.

14. The operation method of claim 11, further comprising:
receiving second data associated with a user utterance in response to the setup utterance from the third external device via the wireless communication circuit; and
transmitting the second data to the external server.

15. The operation method of claim 11, wherein the wireless communication circuit is configured to provide short range wireless communication on the basis of at least one of Wi-Fi, Bluetooth, ZigBee, and near field communication (NFC).

* * * * *